US012592896B2

(12) United States Patent
    Kolan

(10) Patent No.: US 12,592,896 B2
(45) Date of Patent: Mar. 31, 2026

(54) METHOD AND APPARATUS FOR QUALITY OF SERVICE ASSURANCE FOR WebRTC SESSIONS IN 5G NETWORKS

(71) Applicant: Samsung Electronics Co., Ltd., Suwon-si (KR)

(72) Inventor: Prakash Reddy Kolan, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/450,974

(22) Filed: Aug. 16, 2023

(65) Prior Publication Data

US 2024/0080275 A1     Mar. 7, 2024

Related U.S. Application Data

(60) Provisional application No. 63/411,446, filed on Sep. 29, 2022, provisional application No. 63/401,385, filed on Aug. 26, 2022.

(51) Int. Cl.
    *H04L 47/62*       (2022.01)
    *H04L 47/2416*     (2022.01)
    *H04L 65/80*       (2022.01)

(52) U.S. Cl.
    CPC ...... *H04L 47/6215* (2013.01); *H04L 47/2416* (2013.01); *H04L 65/80* (2013.01)

(58) Field of Classification Search
    CPC . H04L 47/6215; H04L 47/2416; H04L 65/80; H04L 47/805
    See application file for complete search history.

(56) References Cited

U.S. PATENT DOCUMENTS

| | | |
|---|---|---|
| 10,499,105 B1 | 12/2019 | Pique Corchs et al. |
| 2017/0163422 A1 | 6/2017 | Chatterjee et al. |

(Continued)

FOREIGN PATENT DOCUMENTS

| | | |
|---|---|---|
| WO | 2021026509 A1 | 2/2021 |
| WO | 2022154823 A1 | 7/2022 |

OTHER PUBLICATIONS

"3rd Generation Partnership Project; Technical Specification Group Services and System Aspects; 5G Media Streaming (5GMS); General description and architecture (Release 18)", 3GPP TS 26.501 V18.0.0, Dec. 2022, 143 pages.

(Continued)

*Primary Examiner* — June Sison

(57)                    ABSTRACT

An apparatus includes a communication interface and a processor operably coupled to the communication interface. The processor is configured to receive an expected service level agreement (SLA) for a media service from a service provider, where the media service includes a plurality of media flows. The processor is also configured to provision a network slice that includes media functions based on the expected SLA. The processor is further configured to configure the media functions in the network slice with flow prioritization information for each media flow among the plurality of media flows. Additionally, the processor is configured to determine performance of each of the media flows. The processor is also configured to perform adjustment of the service parameters based on the determination that the performance of one or more of the media flows is below the expected SLA.

16 Claims, 26 Drawing Sheets

(56) References Cited

U.S. PATENT DOCUMENTS

| | | | | |
|---|---|---|---|---|
| 2020/0167258 | A1* | 5/2020 | Chattopadhyay | G06F 9/5088 |
| 2021/0367892 | A1* | 11/2021 | Young | H04L 41/5025 |
| 2022/0141545 | A1 | 5/2022 | Chhibber et al. | |
| 2023/0006889 | A1* | 1/2023 | Thyagaturu | H04L 41/5054 |
| 2023/0254267 | A1* | 8/2023 | Kolan | H04W 28/0268 |
| | | | | 709/226 |
| 2024/0015569 | A1* | 1/2024 | Doostnejad | H04L 47/24 |
| 2024/0372819 | A1* | 11/2024 | Shah | H04L 47/821 |
| 2025/0088464 | A1* | 3/2025 | Taneja | H04W 28/0268 |

OTHER PUBLICATIONS

Alvestrand, "Overview: Real-Time Protocols for Browser-Based Applications", Internet Engineering Task Force (IETF), RFC 8825, Jan. 2021, 17 pages.
Perkins et al., "Media Transport and Use of RTP in WebRTC", Internet Engineering Task Force (IETF), RFC 8834, Jan. 2021, 39 pages.
Alvestrand, "Transports for WebRTC", Internet Engineering Task Force (IETF), RFC 8835, Jan. 2021, 13 pages.
Jones et al., "Differentiated Services Code Point (DSCP) Packet Markings for WebRTC QoS", Internet Engineering Task Force (IETF), RFC 8837, Jan. 2021, 9 pages.
International Search Report and Written Opinion issued Dec. 18, 2023 regarding International Application No. PCT/KR2023/012681, 6 pages.
Extended European Search Report issued Nov. 11, 2025 regarding Application No. 23857795.1, 17 pages.

\* cited by examiner

1300

Expected SLA information 1302
from ASP or network

1304

Measure each SLA parameter at
endpoint location

1306

Get SLA parameter of
next highest priority

1308

Is current value of
parameter close to
expected SLA value

Yes

No

1310

1. Inform network to update slice
properties

2. Wait pre-determined time interval

1312

No

IS QoS of WebRTC
sessions assured?

Yes

END

2600

2602

RECEIVE AN EXPECTED
SLA FOR A MEDIA SERVICE

2604

PROVISION A NETWORK SLICE THAT INCLUDES
MEDIA FUNCTION BASED ON THE EXPECTED SLA

2606

CONFIGURED THE MEDIA FUNCTIONS IN THE
NETWORK SLICE WITH FLOW PRIORITIZATION

2608

DETERMINE A PERFORMANCE
OF THE MEDIA FLOWS

2610

PERFORM ADJUSTMENT OF THE SERVICE
PARAMETERS BASED ON PERFORMANCE
BEING BELOW THE EXPECTED SLA

METHOD AND APPARATUS FOR QUALITY OF SERVICE ASSURANCE FOR WebRTC SESSIONS IN 5G NETWORKS

CROSS-REFERENCE TO RELATED APPLICATION AND PRIORITY CLAIM

This application claims priority under 35 U.S.C. § 119(e) to U.S. Provisional Patent Application No. 63/401,385 filed on Aug. 26, 2022, and U.S. Provisional Patent Application No. 63/411,446 filed on Sep. 29, 2022, which are hereby incorporated by reference in their entirety.

TECHNICAL FIELD

This disclosure relates generally to multimedia devices and processes. More specifically, this disclosure relates to methods and apparatuses for quality of service (QoS) assurance for web real-time communication (WebRTC) sessions in 5G networks.

BACKGROUND

A real-time communication system using WebRTC was developed as a peer-to-peer media flow exchange system where communicating peers use a set of WebRTC signaling servers to setup end-to-end media connections to exchange one or more media flows. Because of the capability of endpoint devices and network capabilities, traditional audio and two dimensional (2D) video flows were possible to be exchanged between communicating peers. With processing power enhanced in the network, two-way conversational systems were capable of operating a multi-party conference system where media flows from each peer were mixed in a network conference media function and the mixed media stream was then delivered to all other users in the conversation.

SUMMARY

This disclosure provides methods and apparatuses for QoS assurance for WebRTC sessions in 5G networks.

In a first embodiment, apparatus includes a communication interface and a processor operably coupled to the communication interface. The processor is configured to receive an expected service level agreement (SLA) for a media service from a service provider, wherein the media service includes a plurality of media flows. The processor is also configured to provision a network slice that includes media functions based on the expected SLA. The processor is further configured to configure the media functions in the network slice with flow prioritization information for each media flow among the plurality of media flows. Additionally, the processor is configured to determine performance of each of the media flows. The processor is also configured to perform adjustment of the service parameters based on the determination that the performance of one or more of the media flows is below the expected SLA.

In a second embodiment, a method includes receiving an expected service level agreement (SLA) for a media service from a service provider, wherein the media service includes a plurality of media flows. The method also includes provisioning a network slice that includes media functions based on the expected SLA. The method further includes configuring the media functions in the network slice with flow prioritization information for each media flow among the plurality of media flows. The method additionally includes determining performance of each of the media flows and performing adjustment of the service parameters based on the determination that the performance of one or more of the media flows is below the expected SLA.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
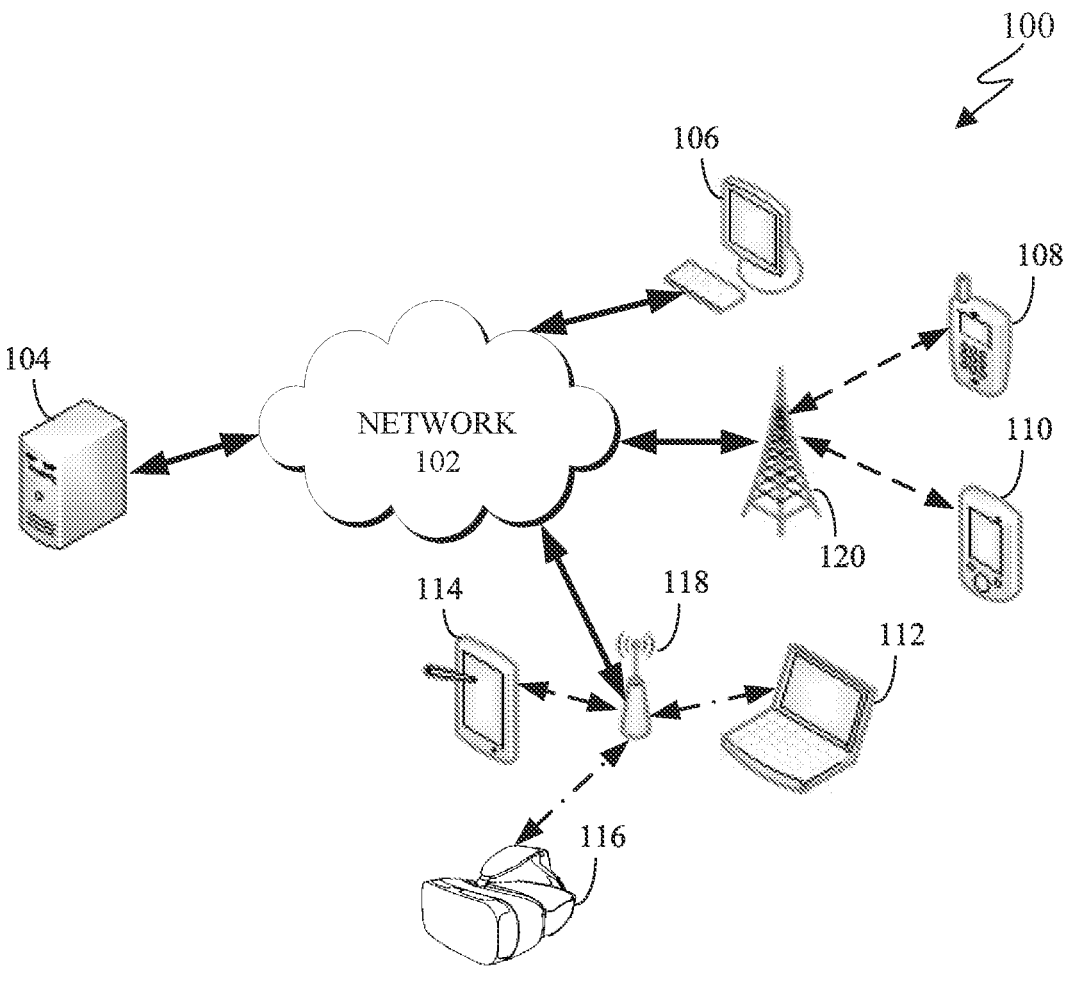
FIG. 1 illustrates an example communication system in accordance with an embodiment of this disclosure.

FIGS. 1 through 26, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

Traditional WebRTC was a best effort service since the communication was over the Internet between participating peers, and the client endpoints were primarily browser based. WebRTC QoS was based on local prioritization of media flows in the outbound direction so high priority flows had a higher chance of being delivered than lower priority flows. In addition, WebRTC media flows were marked using differentiated services code point (DSCP) for forwarding treatment in the network. However, these QoS mechanisms were not enough as DSCP packet markings are not strictly followed in the network. In addition, local prioritization would work for traditional media types such as audio and 2D video. With enhanced media types such as 3D capture encodings, volumetric media types, tactile media types, etc., simple local prioritization schemes are not enough. In addition, there are no QoS assurance mechanisms for WebRTC where the quality of the session is assured.

The disclosure provides aspects related to assuring quality of WebRTC sessions when WebRTC is provided in a managed network; provisioning of WebRTC service parameters by an external WebRTC service provider; and using network slicing for differentiated treatment of WebRTC traffic. Features described in this disclosure include prioritization of WebRTC media flows using priority queues and network segment delay configurations in a network slice; network and UE influenced methods for assuring QoS of WebRTC sessions; and use of mobile operator core and edge network slicing for WebRTC services WebRTC allows for real-time communication among participating peers using exchange of real-time media flows between their WebRTC endpoints. Media flows of different types (e.g., voice, video, data) are possible for exchange between participating peers to enable real time communication. With advances in WebRTC related technologies, multi-party communication is possible where media flows originating from one participant is made available to every other participant in the communication. Media gateway devices are provisioned to mix media flow traffic of multiple users before being forwarded to a participant. Specifications are developed to provide certain amount of security, quality of service (QoS) and quality of experience (QoE) to end users participating in WebRTC sessions.

Traditionally, WebRTC services were deployed as internet applications to enable communication between two or more end users. With the advent of newer 5G related technologies, attempts are being made to make this service available as a subscription based service to MNO users. For MNO users, quality is of paramount importance, so the WebRTC services are to be provided with certain quality guarantees. WebRTC relies on endpoint defined prioritization of media flows to influence outgoing bit rate/throughput of media flows, and DSCP packet marking for network level QoS. However, to provision WebRTC services in an MNO network, certain QoS mechanisms and management methods have to be defined so the WebRTC sessions in the MNO network do not suffer QoS issues.

The disclosure describes aspects related to QoS management of WebRTC sessions when provisioned for use of 5G users; QoS aspects of Inter-MNO WebRTC sessions spanning more than one operator network; and adjusting QoS parameters/schemes for optimizing end-to-end QoS of WebRTC sessions. Described in this disclosure include are methods for monitoring QoS and re-configuration of parameters of different QoS schemes and compensating QoS scheme parameters using current QoS status information.

The use of computing technology for media processing is greatly expanding, largely due to the usability, convenience, computing power of computing devices, and the like. Portable electronic devices, such as laptops and mobile smart phones are becoming increasingly popular as a result of the devices becoming more compact, while the processing power and resources included a given device is increasing. Even with the increase of processing power portable electronic devices often struggle to provide the processing capabilities to handle new services and applications, as newer services and applications often require more resources that is included in a portable electronic device. Improved methods and apparatus for configuring and deploying media processing in the network is required.

Cloud media processing is gaining traction where media processing workloads are setup in the network (e.g., cloud) to take advantage of advantages of the benefits offered by the cloud such as (theoretically) infinite compute capacity, auto-scaling based on need, and on-demand processing. An end user client can request a network media processing provider for provisioning and configuration of media processing functions as required.

Figures discussed below, and the various embodiments used to describe the principles of the present disclosure in this' patent document are by way of illustration only and should not be construed in any way to limit the scope of the disclosure. Those skilled in the art will understand that the principles of the present disclosure may be implemented in any suitably-arranged system or device.

Figure 2:
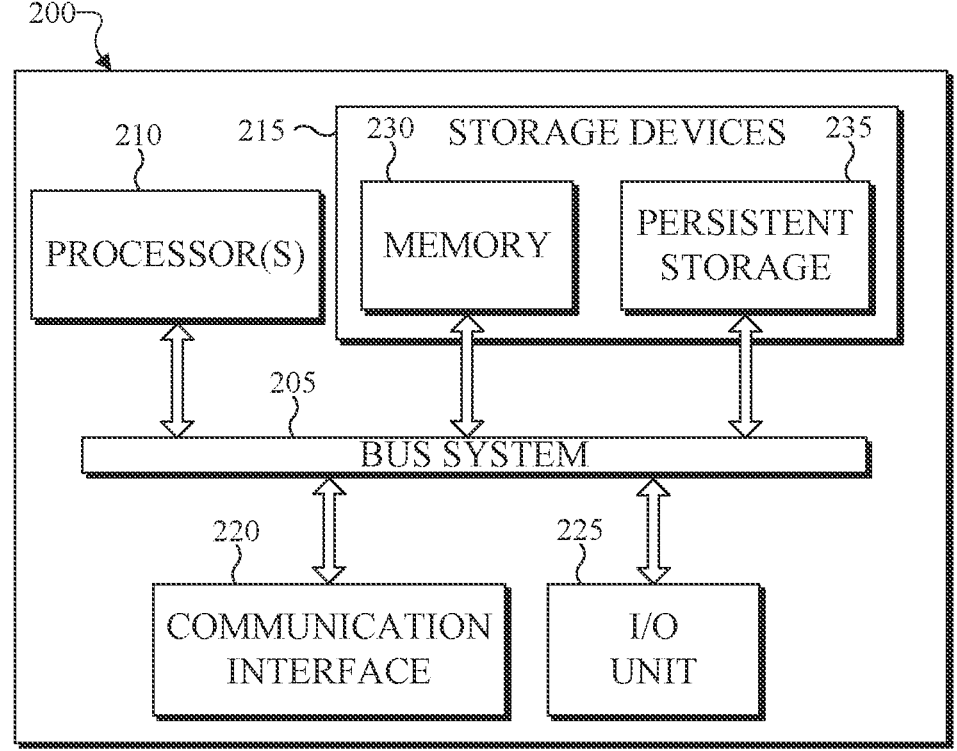
FIGS. 2 and 3 illustrate example electronic devices in accordance with an embodiment of this disclosure.
Figure 3:
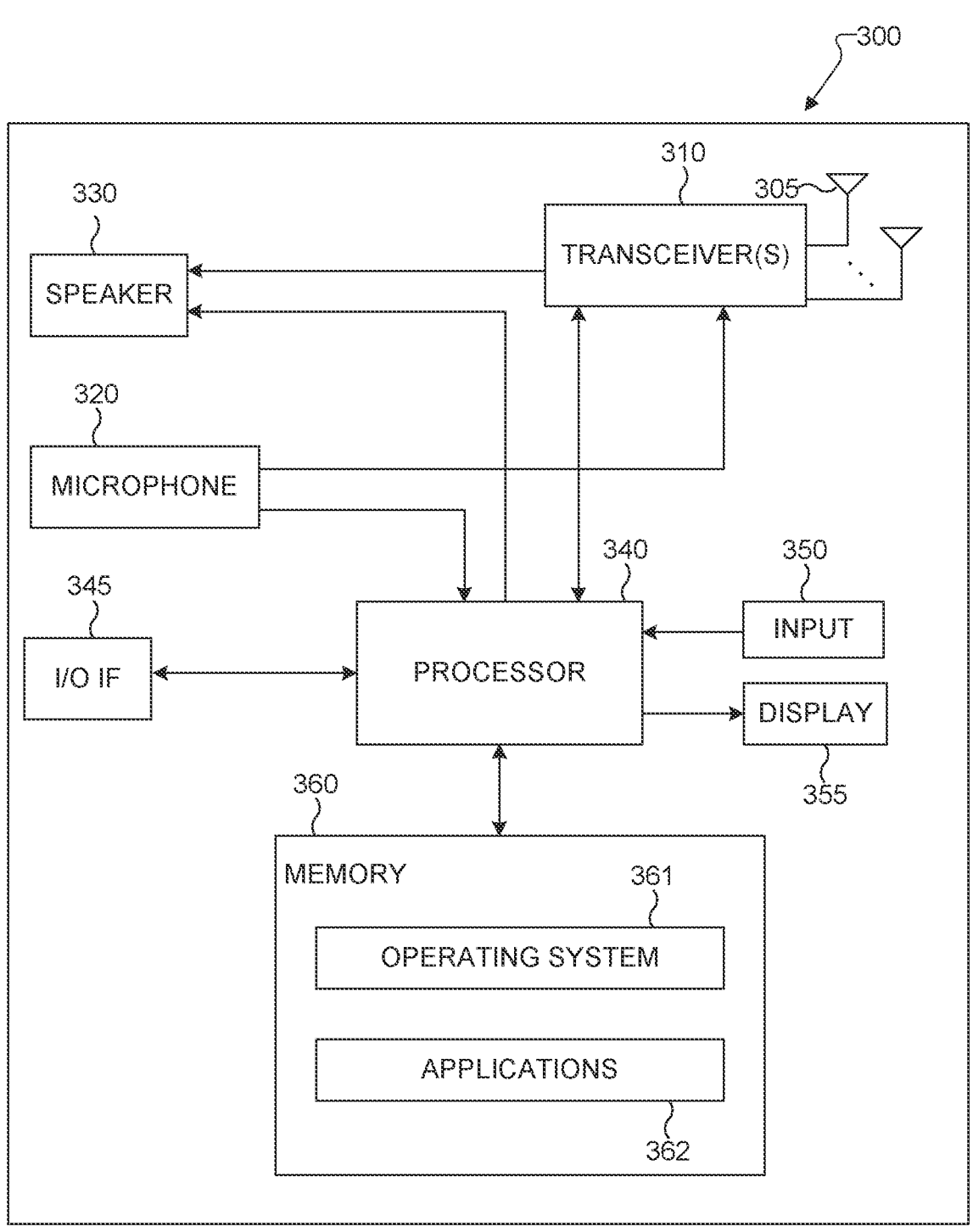

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

As shown in FIG. 1, the communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. In certain embodiments, each server 104 can include an encoder. In certain embodiments, the server 104 can provide QoS assurance for WebRTC sessions in 5G networks to the client devices 106-116.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications.

In this example, some client devices 108-116 communicate indirectly with the network 102. For example, the mobile device 108 and PDA 110 communicate via one or more base stations 118, such as cellular base stations 120 or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s).

In certain embodiments, any of the client devices 106-114 can utilize or perform processes for QoS assurance for WebRTC sessions in 5G networks. Similarly, in various embodiments, the server 104 can utilize or perform processes for QoS assurance for WebRTC sessions in 5G networks.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can provide QoS assurance for WebRTC sessions in 5G networks.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit information related to QoS assurance for WebRTC sessions in 5G networks to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

The RF transceiver 310 receives from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to RX processing circuitry that generates a processed baseband signal by filtering, decoding, and/or digitizing the baseband or intermediate frequency signal. RX processing circuitry transmits the processed baseband signal to the speaker 330 (such as for voice data) or to the processor 340 for further processing (such as for web browsing data).

TX processing circuitry receives analog or digital voice data from the microphone 320 or other outgoing baseband data from the processor 340. The outgoing baseband data can include web data, e-mail, or interactive video game data. TX processing circuitry encodes, multiplexes, and/or digitizes the outgoing baseband data to generate a processed baseband or intermediate frequency signal. The RF transceiver 310 receives the outgoing processed baseband or intermediate frequency signal from TX processing circuitry and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry. In certain embodiments, the processor 340 can provide QoS assurance for WebRTC sessions in 5G networks.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content in multiple media flows over separate network slices. The processor 340 can provide QoS assurance for WebRTC sessions in 5G networks.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
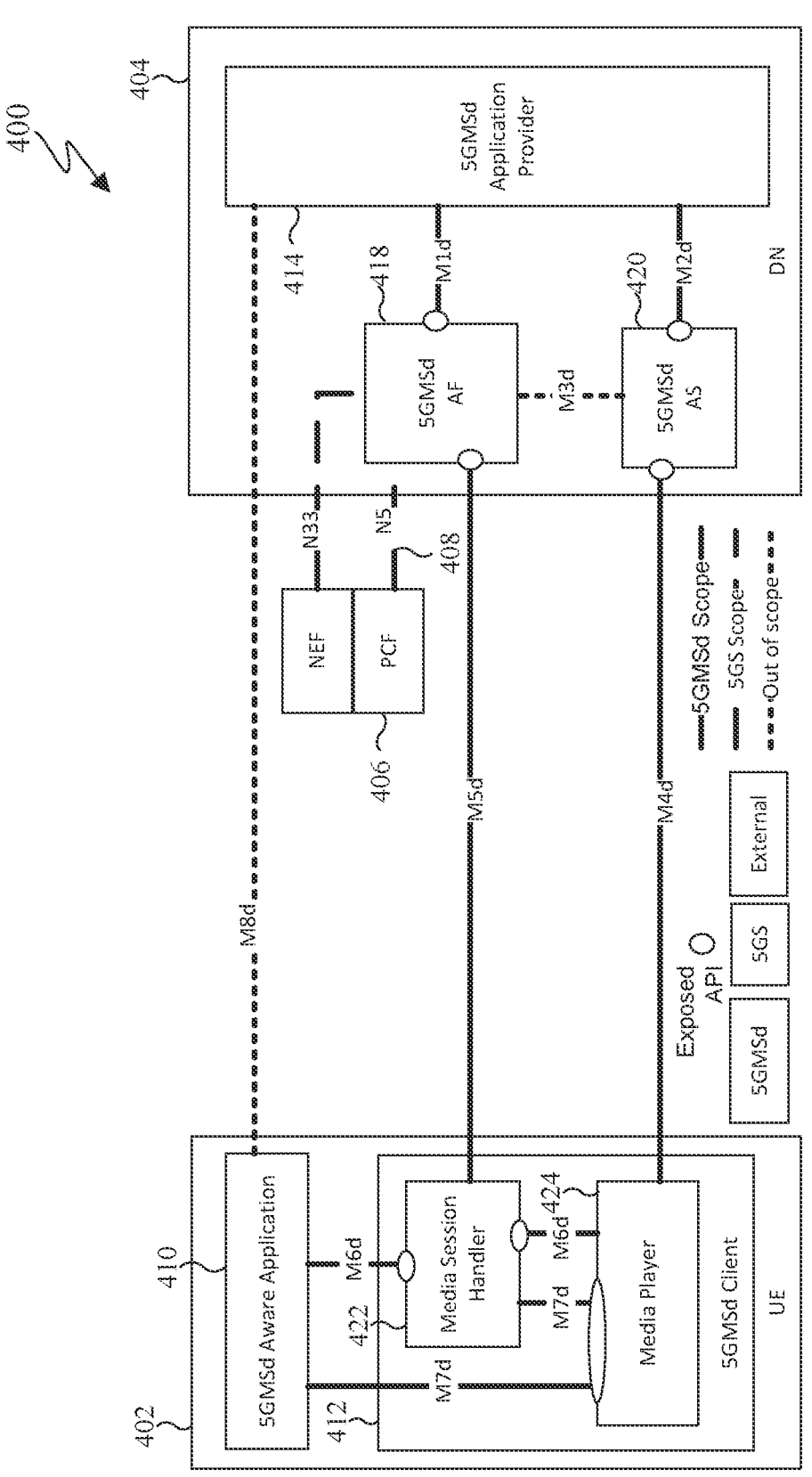
FIG. 4 illustrates an example architecture for media streaming in accordance with this disclosure.

FIG. 4 illustrates an example architecture 400 for media streaming in accordance with this disclosure. The embodiment of the media streaming architecture 400 illustrated in FIG. 4 is for illustration only. FIG. 4 does not limit the scope of this disclosure to any particular implementation of an electronic device.

5G media streaming is enabled by setting up application functions in a core data network 404. A signaling application function server 418 that performs signaling function(s) and a media application function server 420 that performs media functions. There can be multiple instances of these application functions the core data network 404 depending upon application requirements. Different components of UE 402 connect to these application functions to exchange signaling and media data to receive a 4G media streaming service offered by the mobile operator. The signaling application function server 418 can be represented by server 200 shown in FIG. 2 and the UE 403 can be represented by the electronic device shown in FIG. 3.

As shown in FIG. 4, 3GPP TS 26.512 specifies reference for media streaming architecture 400 for 4G media streaming (5GMS). 3GPP SA working group 4 (SA4) is standardizing media services for deployment in a 4G network. Different system components for 4G media streaming architecture 400 can include a UE 402 and a data network 404. The UE 402 can include an aware application 410, and an edge enabler client 412 (5GMSd client). The data network 404 can include an application provider 414 (5GMSd application provider), a signaling application function server 418 (5GMSd AF), and a processing media application function server (5GMSd) 420. The 4GMSd client 412 can include a media session handler 422 and a media player 424. The 4GMSd client 412 can correspond to the edge enabler client 412 shown in FIG. 4.

The aware application 410 is stored in the UE 402. The aware application 410 receives application service information from the application provider. The application service information is then used for retrieving information and data related to that application from the data network.

The signaling application function server 418 is a function in a data network 404 that performs signaling functions of the application service. The signaling application function server 418 provides various control functions to the media session handler on the UE 402 and/or the 4GMSd application provider. The signaling application function server 418 may relay or initiate a request for different policy or charging function (PCF) 406 treatment or interact with other network functions.

The media application function server 420 is an application server that hosts media functions. The media application function server 420 is dedicated to media streaming. The media application function server 420 can stream volumetric media to the UE 402.

The media session handler 422 is a component of the UE 402 that enables communication with signaling application function server 418 in the data network 404. The communications with the signaling application function server 418 are for setting up the relevant media channels between UE 402 and the data network 404.

The media player 424 is a component of the UE 402. The media player 424 can receive media data from the media application function in the data network 404. The media player 424 can provide data to the 4GMSd aware application 410.

Although FIG. 4 illustrates a media streaming architecture 400, various changes may be made to FIG. 4. For example, the media streaming architecture 400 and its individual components can vary as needed or desired. Also, the number and placement of various components of the media streaming architecture 400 can vary as needed or desired. In addition, the media streaming architecture 400 may be used in any other suitable media streaming process and is not limited to the specific processes described above.

Figure 5:
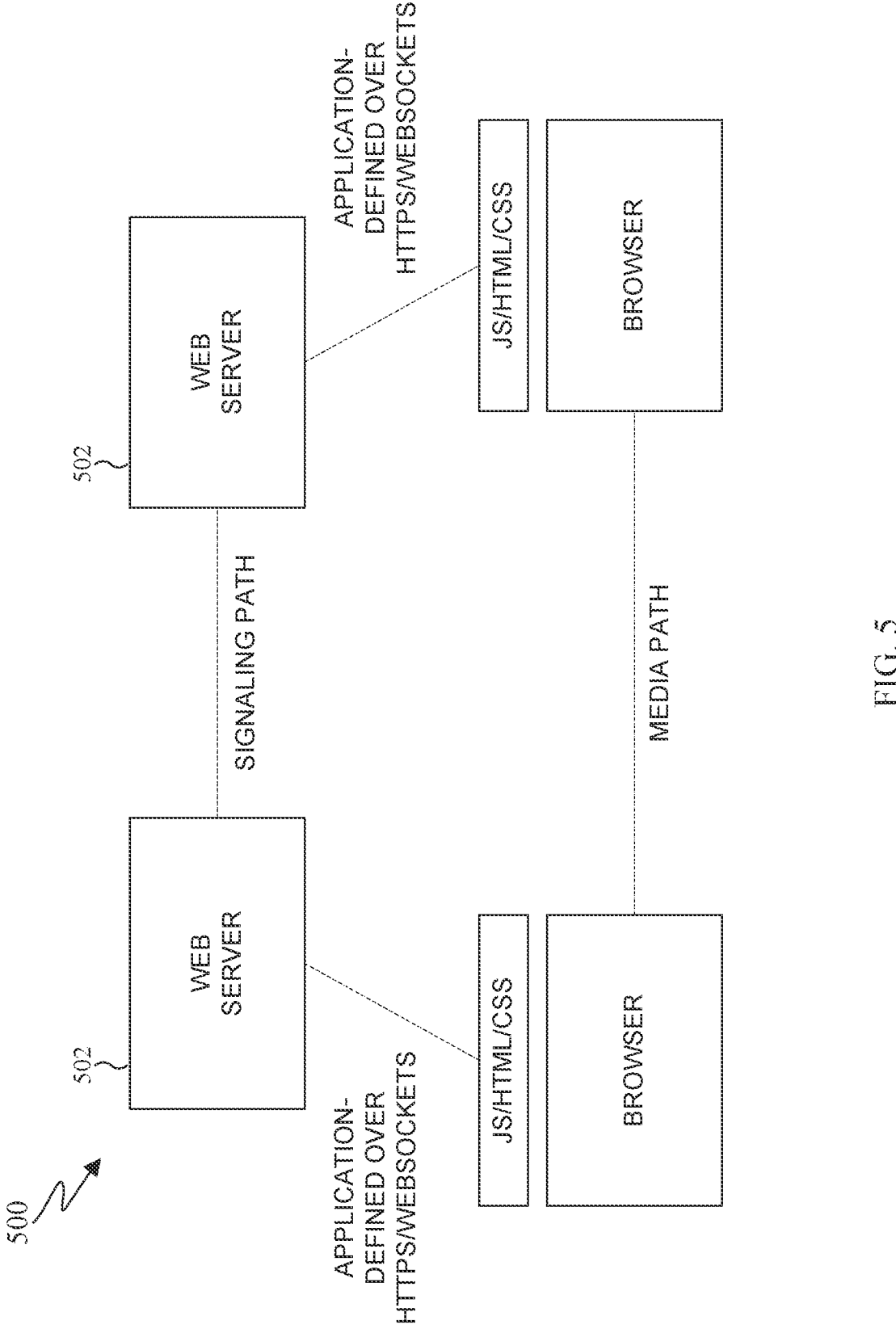
FIG. 5 illustrates an example WebRTC between two clients in accordance with this disclosure.

FIG. 5 illustrates an example WebRTC 500 between two clients in accordance with this disclosure. The embodiment of the WebRTC 500 illustrated in FIG. 5 is for illustration only. FIG. 5 does not limit the scope of this disclosure to any particular implementation of a media streaming system.

Figure 6:
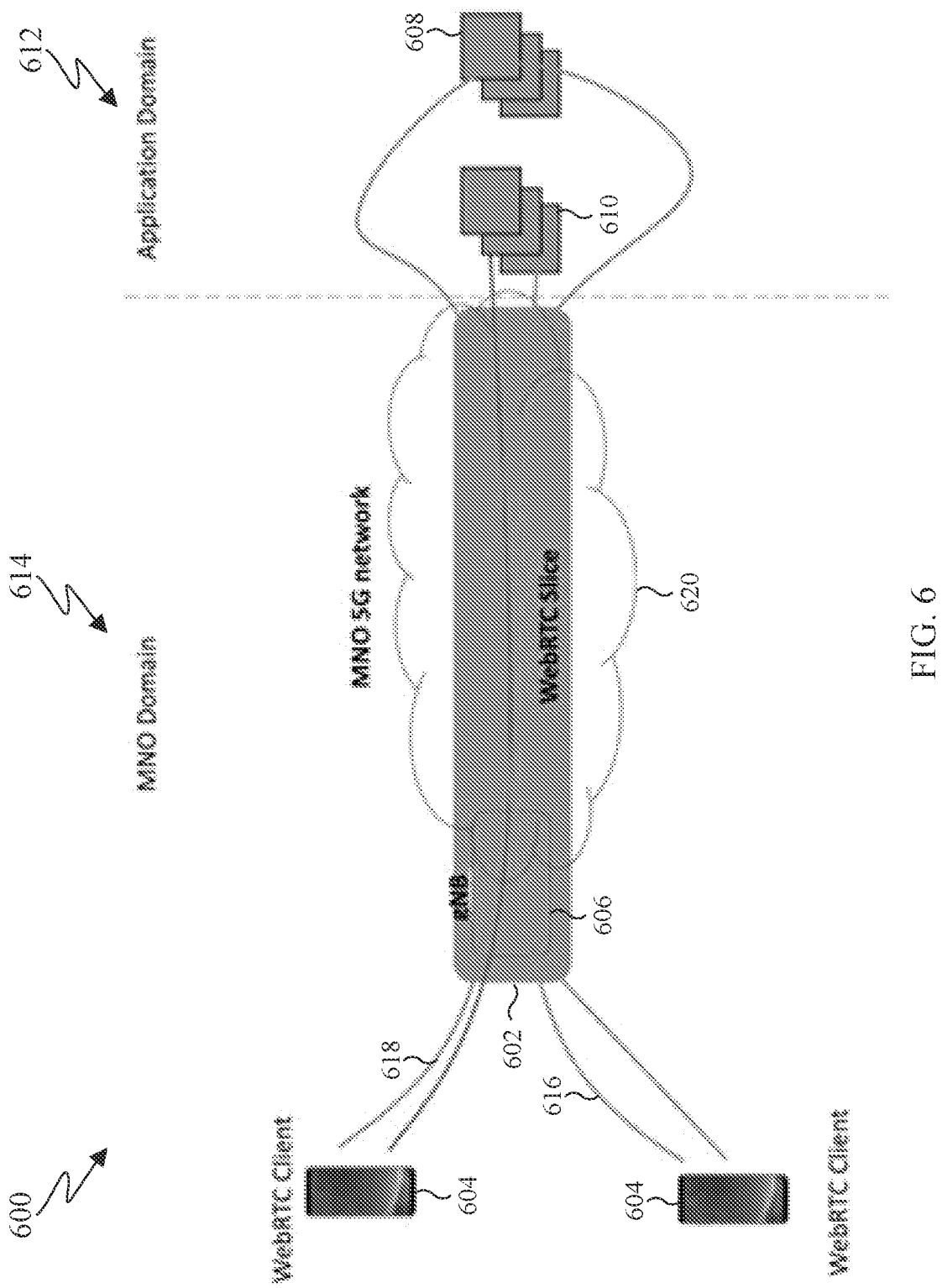
FIG. 6 illustrates an example WebRTC session in a network slice in accordance with this disclosure.

As shown in FIG. 5, WebRTC 500 is a real-time communication protocol between two peers (usually using a browser client 604 shown in FIG. 6). WebRTC 500 provides support for direct interactive rich communication between two peer endpoints. Many Internet Engineering Task Force (IETF) standard documents discuss about WebRTC protocol (RFC 8825), transports for WebRTC (RFC 8834, 8835 etc.). A simple two way communication between two peers using WebRTC is described in request for comments (RFC) 8825 and is as shown in FIG. 5.

As shown in FIG. 5, one or more signaling servers 502 help set up of WebRTC sessions between two browser clients. During the session setup phase, the two clients agree on media and data channels descriptions so media payload and data can be transported directly between the two peers. A frequently used protocol for agreeing on session descriptions is SDP. RTP and RTCP protocols are used for the transfer of peer-to-peer media and control data. A WebRTC data channel establishment protocol (RFC 8832) is used for establishing a communication channel to transfer data between the two peers. In addition to signaling and media protocols, session traversal utilities for network address translation (NAT) (STUN) as specified in RFC 5389 and 8489, traversal using relays around NAT (TURN) as specified in RFC 5766 and 6062), and interactive connectivity establishment (ICE) as specified in RFC 5245 and 8445) protocols can be used during session setup phase to discover and enable communication between peers that are behind a NAT.

WebRTC 500 can use differentiated service code point (DSCP) packet markings (RFC 8837) for QoS. A set of DSCP values are recommended in this standard for WebRTC applications. In addition, the possible configurations for WebRTC transport are follows as specified in RFC 8835, which include each media stream carried on its own 5-tuple, media streams can be grouped by media type into 5-tuples (such as carrying all audio on one 5-tuple); and all media sent over a single 5-tuple, with or without differentiation into 6-tuples based on DSCPs. In each of the configurations mentioned, data channels may be carried in their own 5-tuple or multiplexed together with one of the media flows.

As WebRTC 500 was primarily developed for real-time communication between peers over the Internet, the QoS possibilities for WebRTC 500 are limited to the QoS that is possible over the Internet, i.e., the DSCP mechanism. However, WebRTC 500 can be a 5G service to registered 5G mobile users. A mapping of WebRTC technology to that of an identical service over 5G networks is being made in 3GPP. However, 3GPP specified QoS for 5G flows using 5QI QoS model as specified in 3GPP TS 23.501. In this context, an attempt can be easily made to map the service classes and DSCP values of WebRTC applications to the possible 5QI values in 5G if such a service can be deployed and delivered over 5G networks.

3GPP SA4 is studying deployment architectures for WebRTC services in 5G networks and being specified in technical report (TR) 26930, or TS 26.113, or TS 26.506. A set of collaboration scenarios for WebRTC in 5G networks are being studied such as below.

In a first scenario of over the top (OTT) WebRTC, WebRTC service components, such as the signaling server and STUN/TURN/ICE/MCU functions, are deployed in external service provider domain. The WebRTC service is provided as an OTT service to operator users.

In a second scenario of MNO provided trusted WebRTC functions, the WebRTC helper functions such as the STUN/TURN/MCU etc. are provided by the MNO, but the signaling server is deployed in the external service provider network.

In a third scenario of MNO facilitated WebRTC services, all the WebRTC functions including the signaling can be provided by the MNO.

For inter-operable WebRTC services, all the WebRTC functions can be provided by the MNO, and the WebRTC services can be inter-operable across different operators.

Traditional WebRTC supports mainly two kinds of QoS mechanisms, which include local prioritization of media flow and network QoS using DSCP packet markings. For local prioritization of media flows, the WebRTC endpoint in the UE decides the relative priority of different media streams in the WebRTC service. This applies to the case when there are multiple flows as part of the WebRTC session and the scheduler at the endpoint need to prioritize one media flow over the other. Depending on the priority defined by the endpoint, higher bandwidth and throughput are allocated to the media flows. This helps in making sure the higher priority media flows get to arrive at the required destination at the expense of lower priority media flows in case the network cannot provide sufficient bandwidth of all media flows.

For network QoS using DSCP packet markings, outgoing packets of different media flows from the WebRTC endpoint are marked with DSCP values signifying different packet treatment at network routing and switching devices. It is not mandatory that network switches and routers strictly follow the DSCP packet markings, but the WebRTC specifications recommend doing so.

While the above QoS mechanisms are WebRTC defined QoS mechanisms, when the WebRTC services are provided to mobile operator users, certain type of QoS characteristics are necessary for running WebRTC services in the operator network so end users of WebRTC services have sufficient service experience. Such QoS requirements could be any of a minimum amount of bandwidth allocated to WebRTC session; a minimum amount of throughput for a WebRTC session, a maximum packet loss rate for a WebRTC session, and a maximum end-to-end latency for a WebRTC session. There are also a number of end-to-end QoS schemes for managing the QoS of IP flows in networking. A first QoS scheme can be classification, where such a scheme defines how packets of IP flows have to be classified (e.g., voice packets, data packets etc.) so differential treatment can be provided based on the classification. A second QoS scheme can be policing, where such a scheme defines how bandwidth of IP flows can be controlled at ingress ports, for example. A third QoS scheme can be marking, where such a scheme defines how the packets of IP flows can be marked with certain QoS values so network devices can provide differential treatment for such packets and thereby the associated IP flows. A fourth QoS scheme can be propagation, where such a scheme defines how QoS settings are translated at different locations for end-to-end QoS. For example, how the network stack in endpoints translate the application QoS settings to network QoS settings, mapping of network QoS settings to frame-level QoS settings (e.g., IP→Ethernet), how QoS settings are mapped if encapsulation is used (e.g., GRE tunnels etc.). A fifth QoS scheme can be metering, where such a scheme defines how the bandwidth is enforced at the outbound locations (e.g., egress ports). A sixth QoS scheme can be queuing, where such a scheme defines how queues are managed (e.g., provisioned, measured, etc.) at different locations of the end-to-end network path.

Although FIG. 5 illustrates an example WebRTC 500 between two clients, various changes may be made to FIG. 5. For example, the WebRTC 500 and its individual components can vary as needed or desired. Also, the number and placement of various components of the media WebRTC 500 can vary as needed or desired. In addition, the WebRTC 500 may be used in any other suitable media streaming process and is not limited to the specific processes described above.

FIG. 6 illustrates an example WebRTC session 600 in a network slice 602 in accordance with this disclosure. The embodiment of the WebRTC session 600 illustrated in FIG. 6 is for illustration only. FIG. 6 does not limit the scope of this disclosure to any particular implementation of a media streaming system.

As shown in FIG. 6, network slicing in 5G helps with service differentiation in terms of network configuration and QoS. In 5G, network slices 602 can be used to provide differentiated QoS to the constituent service flows. WebRTC sessions 600 can be delivered over a dedicated/separate network slice 602.

FIG. 6 shows a simple WebRTC session 600 using a network slice 602 called the "WebRTC slice". The figure shows an example session between two clients 604 behind the same base station (gNB) 606. However, the sessions can be generalized for clients 604 behind different gNBs 606.

The WebRTC media and data channel functions 608 can process one or more media types (e.g., audio, video, 3D representations such as point clouds, 3D mesh), and also the WebRTC data channel messages. WebRTC signaling functions 610 can be located in the application domain 612 outside the MNO domain 614. However, it is also possible that mobile network operator (MNO) provides the WebRTC signaling functions 610 inside the operator network in which case the signaling messages 616 do not go over into the application domain 612.

FIG. 6 also serves as an example for media processing in the network, where the media data from clients 604 flow into the application domain from the MNO domain 614, optionally gets processed or translated (example a WebRTC conferencing), and the resultant media traffic 618 is then sent to the clients 604. However, MNO 620 can also provide the WebRTC media functions 608 inside the operator network in which case the media traffic 618 does not go over into the application domain 612, but get processed in the MNO domain 614.

FIG. 6 also serves as an example for media data processing before sending the resultant media data to the communicating clients 604. However, it is possible that no media processing is required (for example, a 2-way WebRTC session) and the media data directly flows between the two clients 604, as shown in FIG. 7.

Although FIG. 6 illustrates an example WebRTC session 600 in a network slice 602, various changes may be made to FIG. 6. For example, the number and placement of various components of the media WebRTC session 600 can vary as needed or desired. In addition, the WebRTC session 600 may be used in any other suitable media streaming process and is not limited to the specific processes described above.

Figure 7:
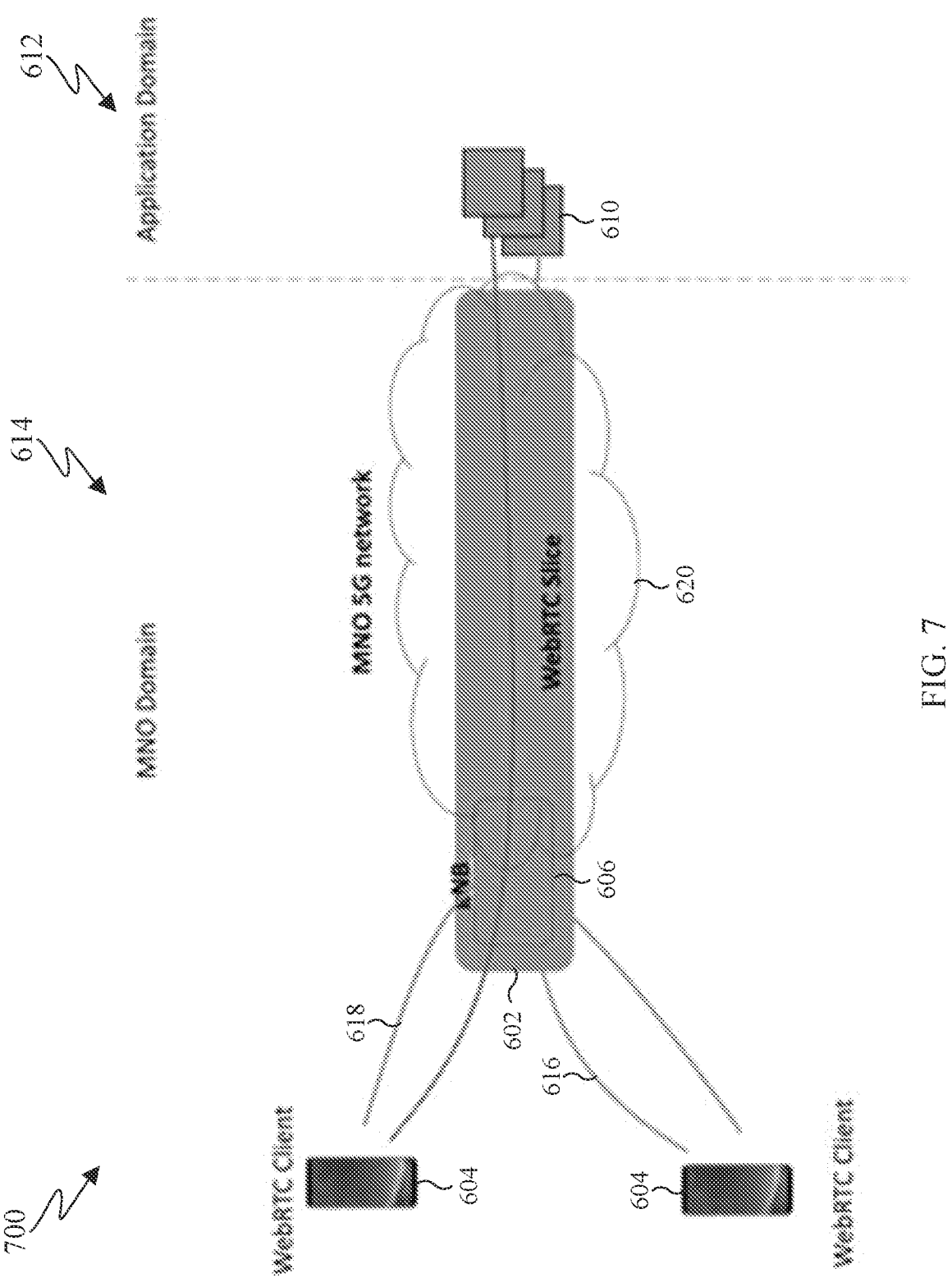
FIG. 7 illustrates an example WebRTC session with direct peer-to-peer media transport in accordance with this disclosure.

FIG. 7 illustrates an example WebRTC session 700 with direct peer-to-peer media transport in accordance with this disclosure. The embodiment of the WebRTC session 700 illustrated in FIG. 7 is for illustration only. FIG. 7 does not limit the scope of this disclosure to any particular implementation of a media streaming system.

As shown in FIG. 7, WebRTC session 700 can be provided to users of an MNO network 620. For WebRTC sessions 700 to be provided to MNO users, application functions (AFs) inside the MNO network can be configured of the WebRTC service requirements, which enable deployment of WebRTC service over the MNO network 620. As part of the service requirement, the expected QoS of the WebRTC session 700 can be specified to the AF. The AF, depending on QoS requirement, can configure necessary slice resources (e.g., with any necessary signaling and media resources), and the WebRTC service 700 becomes operational for use of the WebRTC clients 604 in the MNO domain 614.

Although FIG. 7 illustrates an example WebRTC session 700 with direct peer-to-peer media transport, various changes may be made to FIG. 7. For example, the WebRTC session 700 and its individual components can vary as needed or desired. Also, the number and placement of various components of the WebRTC session 700 can vary as needed or desired. In addition, the WebRTC session 700 may be used in any other suitable media streaming process and is not limited to the specific processes described above.

Figures 8A, 8B:
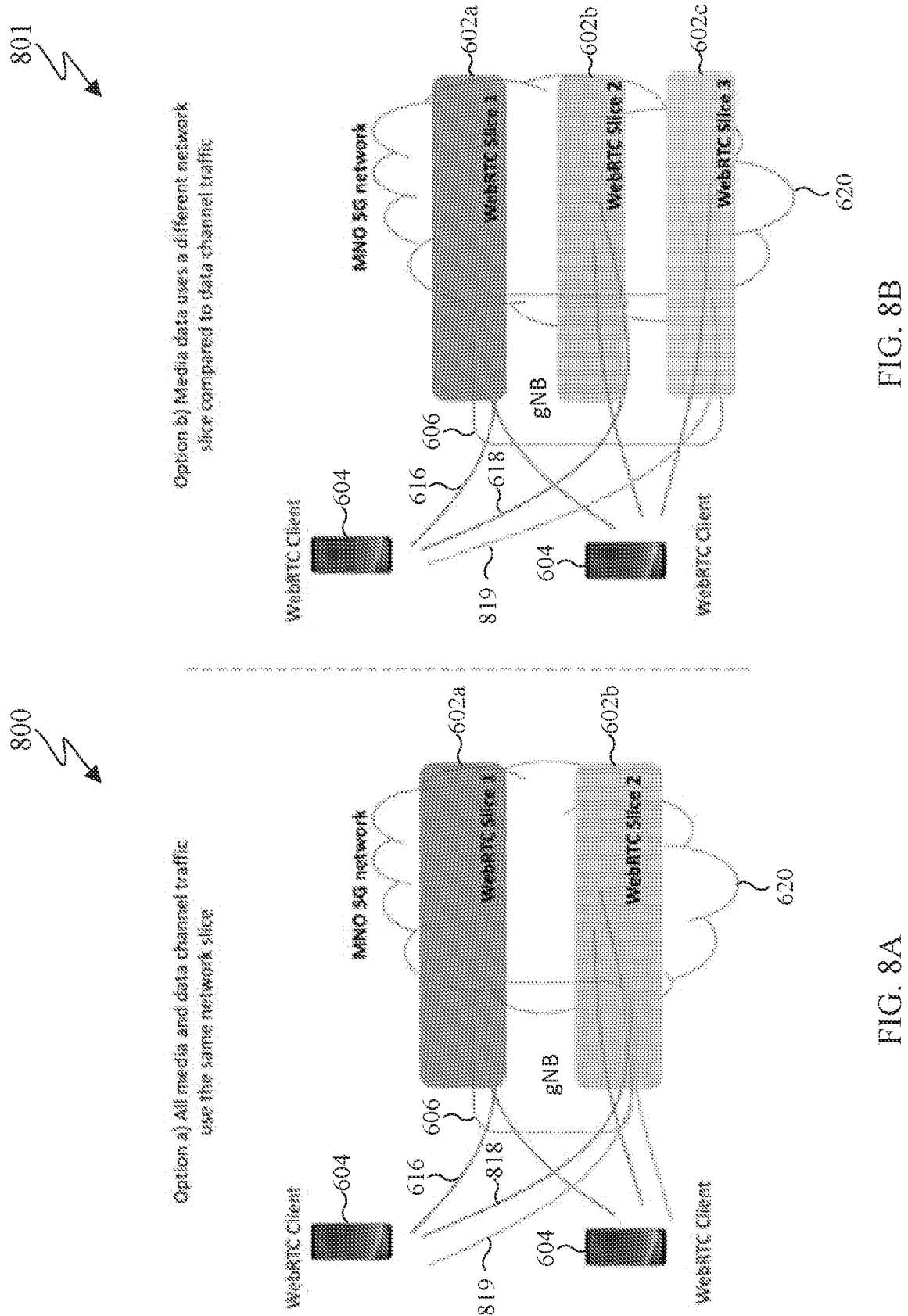
FIGS. 8A and 8B illustrate examples of WebRTC session traffic over multiple network slices in accordance with this disclosure.

FIGS. 8A and 8B illustrate examples of WebRTC session traffic 800 and 801 over multiple network slices in accordance with this disclosure. The embodiments of the WebRTC session traffic 800 and 801 illustrated in FIGS. 8A and 8B are for illustration only. FIGS. 8A and 8B do not limit the scope of this disclosure to any particular implementation of a media streaming system.

While methods for using one network slice 602 for transporting all WebRTC traffic is previously described, FIGS. 8A and 8B provide methods for provisioning multiple network slices for WebRTC sessions 800 and 801.

As shown in FIG. 8A, the media traffic 618 including the media data 818 and data channel traffic 819 is transferred over a single network slice 602b, and all the signaling messages 616 are transferred over a separate network slice 602a. This would be possible if a single network slice 602 cannot accommodate all the signaling messages 616, media data 818, and data channel traffic 819. This arises when the case that the signaling functions 610 and media functions 608 are developed and deployed by different vendors and they cannot inter-operate, and possibly for QoS reasons.

As shown in FIG. 8B, further division of WebRTC traffic becomes possible when the signaling messages 616, media data 818, and the data channel traffic 819 are transported over separate network slices 602a, 602b, and 602c.

For providing WebRTC services over multiple network slices 602, the application service provider (e.g., a WebRTC service provider) can configure network application functions for setup of multiple network slices 602 for serving WebRTC sessions. The operation mode, whether to use WebRTC session traffic 800 or WebRTC session traffic 801, is also specified by the service provider. When the application functions inside the operator network receive the information from the application service provider, the operator can provision the required number of network slices 602 and make the network slices 602 available for transporting WebRTC traffic.

Similar to the case of a single network slice 602, even in this case of multiple network slices 602, the service provider can provide the service requirements (including QoS expectations) to the application function, and the application function can translate the service requirements to slice deployments so the service requirements can be satisfied.

Although FIGS. 8A and 8B illustrate examples of WebRTC session traffic 800 and 801 over multiple network slices, various changes may be made to FIGS. 8A and 8B. For example, the number and placement of various components of the WebRTC session traffic 800 and 801 can vary as needed or desired. In addition, the WebRTC session traffic 800 and 801 may be used in any other suitable media streaming process and is not limited to the specific processes described above.

Figure 9:
FIG. 9 illustrates an example edge slicing for WebRTC in accordance with this disclosure.
Figure 9:
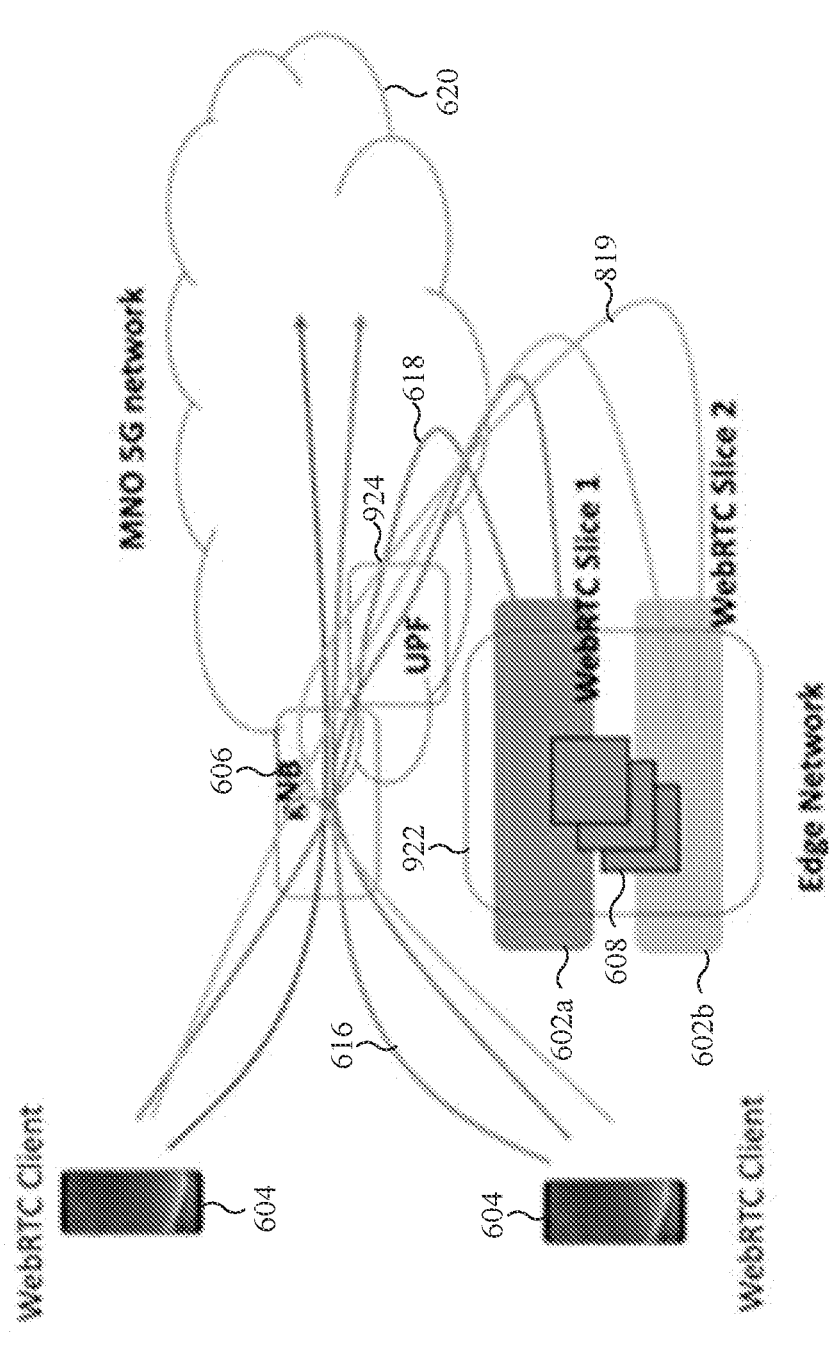

FIG. 9 illustrates an example edge slicing 900 for WebRTC in accordance with this disclosure. The embodiment of the edge slicing 900 illustrated in FIG. 9 is for illustration only. FIG. 9 does not limit the scope of this disclosure to any particular implementation of a media streaming system.

As shown in FIG. 9, the edge network 922 is sliced in a manner that QoS is differentiated for media and data channel traffic. With this option, a separate network slice 602 in the core network can be provisioned for WebRTC traffic or a default network slice 602 can be used in the core network. However, in the edge network 922, different slices 602a and 602b can be provisioned to support differentiated QoS for WebRTC traffic.

As shown in FIG. 9, the edge network 922 can be sliced for providing differentiated QoS to different types of WebRTC traffic. With this deployment option, an edge UPF 924 can be provisioned near the gNB 606 to help route WebRTC traffic to the edge network 922. The QoS for WebRTC traffic can be managed similar to cases described earlier in the disclosure.

FIG. 9 shows WebRTC media and data channel functions 608 processing both the media data 618 and data channel traffic 819 in different edge network slices. In certain embodiments, separate WebRTC media data functions and data channel functions are developed and deployed in different network slices 602, which can be individually responsible for processing media data 618 and data channel traffic 819, respectively.

Although FIG. 9 illustrates an example edge slicing 900 for WebRTC, various changes may be made to FIG. 9. For example, the number and placement of various components of the edge slicing 900 can vary as needed or desired. In addition, the edge slicing 900 may be used in any other suitable media streaming process and is not limited to the specific processes described above.

Figure 10:
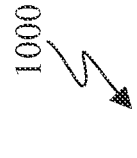
FIG. 10 illustrates an example flow prioritization using priority queues in accordance with this disclosure.

FIG. 10 illustrates an example flow prioritization 1000 using priority queues 1002 in accordance with this disclosure. The embodiment of the flow prioritization 1000 illustrated in FIG. 10 is for illustration only. FIG. 10 does not limit the scope of this disclosure to any particular implementation of a media streaming system.

As shown in FIG. 10, QoS mechanisms for WebRTC address two areas of concern, local prioritization and network treatment of WebRTC traffic using DSCP markings. Local prioritization is concerned with prioritizing outgoing bandwidth for endpoints with high-priority flows over endpoints with low-priority flows. The prioritization can be enabled by the application signaling to lower layers about the priority of each media flow. The WebRTC endpoint can cause data to be emitted in such a way that each stream at each level priority gets to use twice the available bandwidth compared to stream with lower priority.

Network treatment of WebRTC traffic using DSCP markings is concerned with WebRTC endpoints marking outgoing packets with DSCP marking as described in RFC 8837 and the network nodes may allow differential treatment of packets/streams with different DSCP markings. However, such differential treatment was practical for WebRTC flows with two dimensional video data and simple audio data. With newer media types, such as 3D representation data, volumetric data such as points clouds and lightfields etc., prioritization schemes defined by WebRTC may not be feasible. In addition, different media types may have different level of tolerance for stream prioritization. For example, for an animation generated based on user movements, to be sent may have different priority compared to a point cloud media type.

One way to solve the above problem is to define relative priorities among multiple possible media types. However, with a number of media types, WebRTC client developers, leveraging different UE capabilities, may be able to generate media streams with different characteristics. So, just relying only on endpoint level prioritization schemes may not be enough.

Figure 11:
FIG. 11 illustrates an example flow prioritization using network segment delay configurations in accordance with this disclosure.
Figure 11:

To facilitate flow prioritization for WebRTC, flow prioritization 1000 using priority queues 1002 and flow prioritization using configurations of network segments, such as network segments 1102 in the flow prioritization 1100 shown in FIG. 11, can be performed. In the flow prioritization 1000 using priority queues 1002, one or more network slices 602 can be set up to receive WebRTC media and data channel flows from the WebRTC client 604. Each of the slices 602 can be provisioned with one or more priority queues 1002. Each priority queue 1002 can have a configuration of the priority in terms of hold and forward behavior or each priority queue 1002 can have a certain hold time (delay) and forward logic defined. For example, for flows with lower priority can be sent through a priority queue 1002 with a lower priority, which may have a highest amount of hold (delay time) before the stream or packets of that media flow are forwarded upstream.

A network function in the slice can implement a priority queue 1002. This network function can be configured by the session level application function, either directly, or indirectly using other control functions such as a PCF, SMF etc.

Although FIG. 10 illustrates an example flow prioritization 1000 using priority queues, various changes may be made to FIG. 10. For example, the number and placement of various components of the flow prioritization 1000 can vary as needed or desired. In addition, the flow prioritization 1000 may be used in any other suitable media streaming process and is not limited to the specific processes described above.

FIG. 11 illustrates an example flow prioritization 1100 using network segment delay configurations in accordance with this disclosure. The embodiment of the flow prioritization 1100 illustrated in FIG. 11 is for illustration only. FIG. 11 does not limit the scope of this disclosure to any particular implementation of a media streaming system.

As shown in FIG. 11, in flow prioritization 1100 using configurations of network segments 1102, a network service can be composed of multiple forwarding paths (network segments) because a network service is provisioned within a network slice 602. Each network segment 1102 can be configured with network behavior configuration such as the latency configuration, bandwidth configuration, throughput configuration etc.

To facilitate flow prioritization 1100, media flows of lower priority can be forwarded through network segments 1102 with higher delays compared to media flows of higher priority. A higher priority media flow will have a better prioritization compared to a media flow with lower priority.

As shown in FIG. 11, network segments ABD, ACD, and AD can be configured with different delay configurations. For example, a delay configuration of ABD can have a total delay including a delay configuration of segment AB and a delay configuration of segment BD. Similarly, delay configuration of ACD can have a total delay including a delay configuration of segment AC and a delay configuration of segment CD. Based on delay configurations of AB, AC, BD, and CD by the service provider, all the end-to-end delay configurations can be computed and forwarding behavior can be influenced to provide for flow prioritization. Nodes A, B, C, and D can be NFs, AFs, or passive data plane devices in the network slice 602.

The above two prioritization mechanisms function even if different media flows are bundled within the same 5-tuple. For this case, there has to be a media flow splitter provisioned in the network slice 602 that can separate out different media flow streams and send the different media flows using either the priority queues or network segments with different configuration.

The above methods also work for more than one network slice 602. One of the above two prioritization mechanisms using network slicing can be provided in the slice used for WebRTC sessions, which is provided is based on service provider or network operator.

Although FIG. 11 illustrates an example flow prioritization 1100 using network segment delay configurations, various changes may be made to FIG. 11. For example, the number and placement of various components of the flow prioritization 1100 can vary as needed or desired. In addition, the flow prioritization 1100 may be used in any other suitable media streaming process and is not limited to the specific processes described above.

Figure 12:
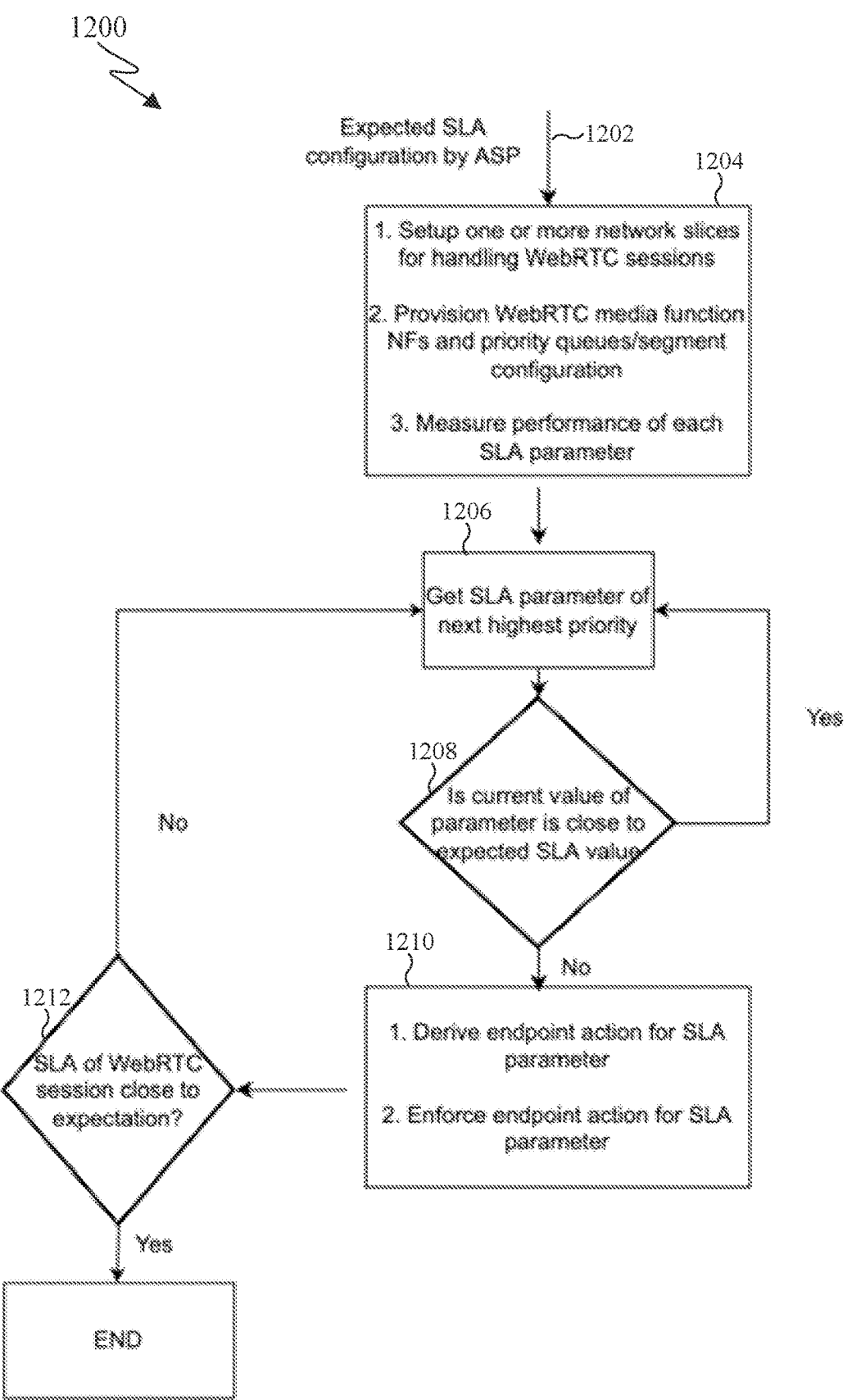
FIG. 12 illustrates an example method for WebRTC QoS assurance using network slicing in accordance with this disclosure.

FIG. 12 illustrates an example method 1200 for WebRTC QoS assurance using network slicing in accordance with this disclosure. For ease of explanation, the method 1200 of FIG. 12 is described as being performed using the electronic devices of FIGS. 2 and 3. However, the method 1200 may be used with any other suitable system and any other suitable electronic device.

QoS for WebRTC can be based on application prioritization of local media flow traffic, i.e., at what rate each of the media stream packets have to be sent given the requirements on total output bandwidth. In addition, network treatment of WebRTC flows can be based on DSCP configuration. WebRTC QoS is a best-effort QoS service, especially when the service goes along with regular Internet traffic. When WebRTC can be provided as a managed service in a network operator environment, QoS of WebRTC can be provided based on the 5G QoS mechanisms defined for operator network flows. However, there is a gap between the expected QoS of WebRTC sessions compared to the actual QoS the WebRTC sessions get in 5G networks.

As shown in FIG. 12, network slicing can be used to provide QoS assurance to WebRTC sessions. External WebRTC service provider configures expected QoS (SLA) for WebRTC sessions at an application function in the 3GPP 5G network in step 1202. The expected QoS can have any of the parameters including upload (UL) and download (DL) bit rate of WebRTC flows, maximum UL and DL packet error rate, maximum UL and DL traffic per UE, maximum UL and DL bit rate per slice, maximum latency in UL and DL directions, delay or latency budget, and UL and DL throughput. This information can be conveyed to the application function in the network that manages all the WebRTC sessions of all the endpoints or clients 604 in the network. In addition to SLA expectations, a service provider can also configure relative priority of SLA parameters.

The electronic device 300 can setup one or more network slices for handling WebRTC sessions, provision WebRTC media functions NFs and priority queues or segment configurations, and measure performance of each SLA parameter in step 1204. Based on configured SLA requirements for WebRTC sessions, application function can work with network operator for provisioning of one or more network slices 602. Each slice 602 can be configured with media functions (e.g., MCU, ICE functions for using STUN, TURN etc.).

Based on expected SLA, the media functions are configured in each of the network slice. The configuration may include priority queues or network segments with delay configurations and media functions to process the received WebRTC media flows.

For QoS assurance, the performance of the media flows in each network slice is measured for each unit time, and an SLA adjustment is computed. The electronic device 300 can determine whether the priority queues 1002 or network segments 1102 in each slice 602 are able to keep up with expected SLA of each parameter applied to each media flow. The electronic device 300 can compute current SLA performance and compute an SLA adjustment needed based on expected SLA and current SLA. The adjustment of the service parameters can be based on a determination that the performance of the media flow is below an expected SLA.

Based on computed SLA adjustment, the outgoing packet behavior at the client 604 can be adjusted. For example, if an adjustment of +ve 20% is required for bit rate parameter, then the outgoing bit rate for each media flow at the sender client 604 is to be increased proportionally among all the media flows. The increase in bit rate at the sender client 604 may require provisioning of additional WebRTC signaling and media functions, which can be instantiated quickly. The same adjustment can be computed for each SLA parameter.

A list of actions can be prepared based on all of the SLA parameters. Probable actions for each SLA parameter could be as follows in TABLE 1.

TABLE 1

| Parameter | Adjustment needed for parameter | Action at endpoint |
|---|---|---|
| UL/DL bit rate | Positive/negative | Positive/negative increase in proportional bandwidth for each media flow. This will result in total bandwidth for all media flows to increase/decrease, which shall be provisioned by the network in the slice that is being used. |

TABLE 1-continued

| Parameter | Adjustment needed for parameter | Action at endpoint |
|---|---|---|
| UL/DL packet error rate | Negative | Decrease in bit rate at the endpoint Increase in FEC packets for reconstruction in the network |
| UL/DL traffic per UE | Positive/negative | Positive/negative increase in proportional bandwidth for each media flow per UE endpoint. This will result in total bandwidth for all media flows for a UE endpoint to increase/decrease, which shall be provisioned by the network in the slice that is being used. |
| UL/DL bit rate per slice | Positive/negative | Proportionally allocate/deallocate additional bit rate for slice among all the UEs using that slice. This will result in proportionally increase/decrease the bit rate for each media flow generated at that UE endpoint |
| UL/DL latency | Negative | Decrease in bit rate at the endpoint to minimize latency |
| UL/DL throughput | Positive/negative | Proportionally allocate/deallocate additional throughput for each UE using that slice. This will result in proportionally increase/decrease the throughput for each media flow generated at that UE endpoint |

The electronic device 300 can identify an SLA parameter from the list of SLA parameters in step 1206. Based on the list of actions, the action corresponding to the highest priority SLA parameter can be applied.

The electronic device 300 can determine whether a current value of a parameter is close or meets the expected SLA value in step 1208. The SLA performance can be measured after a certain time or certain amount of time. If the QoS does not reach the expected SLA, the method proceeds to step 1206. One after the other actions of all SLA properties are performed until the QoS reaches the expected SLA values. The determination of closeness can be based on being within a predetermined range of the expected SLA value or a predetermined percentage above or below the expected SLA value.

The electronic device 300 can derive an endpoint action for the SLA parameter and enforce the endpoint action for the SLA parameter in step 1210. To facilitate adjustment at the source endpoint, the properties of the slices 602 that are carrying the WebRTC media flows are adjusted using the help of network. Information from the service provider to the application functions inside the operator network for provisioning and management of WebRTC sessions using network slicing is shown below in TABLE 2.

TABLE 2

| Field | Type | Description |
|---|---|---|
| Slice-Id | Slice-type | Slice Id of the network slice to use for WebRTC sessions. The Slice Id corresponds to the S-NSSAI of the slice that will be used to run WebRTC services. If this is specified, all the WebRTC signaling, media, and data channel messages will be transferred over the slice with this Slice-Id |
| Use-multiple-slices | Boolean | Field that specifies that more than one network slice be provisioned for WebRTC sessions. If this field is specified, then the provider will provide the list of Slice-Ids to use for WebRTC session. This field needs to be set to "true" for using multiple slices. To be set to "false" if only one slice is preferred for WebRTC sessions. |
| Slice-Id-list | List | List of slices to use for WebRTC media and data channel messages. This field shall be present if the Use-multiple-slices field is specified to be true |
| Slice-map | Map | Information mapping Slice-Id to the type of traffic/data type that the slice needs to be used for. For a given Slice-Id in the Slice-Id-list, this map has a mapping for Slice-Id and the type of WebRTC traffic it shall carry |
| Signaling-endpoint | URL | URL of the signaling endpoint for WebRTC sessions. When the application function receives this information, it shall forward setup forwarding paths to direct all signaling traffic to this URL. The signaling-endpoint could be either in the operator network or in the external application domain. If the signaling endpoint is in external application domain, application function shall configure data-plane paths to terminate in the DNN of the application domain. If the signaling endpoint is in the operator network, the |

TABLE 2-continued

| Field | Type | Description |
|---|---|---|
| | | application function is responsible for provisioning a signaling function in operator network and assign to this URL which will eventually be conveyed to the WebRTC client. |
| Media-endpoint | URL | URL of the media endpoint for WebRTC sessions. When the application function receives this information, it shall forward setup forwarding paths to direct all media traffic to this URL. The media-endpoint could be either in the operator network or in the external application domain. If the media endpoint is in external application domain, application function shall configure data-plane paths to terminate in the DNN of the application domain. If the media endpoint is in the operator network, the application function is responsible for provisioning a media function in operator network and assign to this URL which will eventually be conveyed to the WebRTC client. |
| Datachannel-endpoint | URL | URL of the data channel endpoint for WebRTC sessions. When the application function receives this information, it shall forward setup forwarding paths to direct all data channel traffic to this URL. The datachannel-endpoint could be either in the operator network or in the external application domain. If the data channel endpoint is in external application domain, application function shall configure data-plane paths to terminate data channel traffic in the DNN of the application domain. If the data channel endpoint is in the operator network, the application function is responsible for provisioning a data channel function in operator network and assign to this URL which will eventually be conveyed to the WebRTC client. |
| Use-edge-slicing | Boolean | Field indicating whether the edge needs to be sliced for providing differentiated QoS to different WebRTC streams. If this field is set to "true", the application function in the core network shall indicate to the edge orchestrator that one or more slices be provisioned in the edge. Further, the application function also provides information about necessary media and data channel functions to be setup in those network slices. |
| Allow-flow-prioritization-using-priority-queues | Boolean | Variable indicating whether priority queues have to be setup in network slices to allow for flow prioritization. Possible values: True: Setup priority queues in network slice (e.g., closer to NF and AF functions in the slice) False: Do not setup priority queues |
| Priority-queue-map | Map | Map of priority queues. Key-value pair where the key value represents the priority of media flow, and value represents the hold (delay) time that each packet has to be held before being forwarded upstream |
| Flow-priority-map | Map | Map of flow to priority values. Key-value pair where the key represents the flow-id and value represents the priority of the flow. The flow-id can be generated based on either the 5-tuple(source address, source-port, destination-address, destination-port, protocol) or 6 tuple (source address, source-port, destination-address, destination-port, protocol, stream identifier e.g., SSRC) in case multiple streams get multiplexed on the same 5-tuple. This map has to be provided by the application service provider so either the priority queue maps or network segment maps can be used for regulating flows of different priorities |
| Allow-flow-prioritization-using-network-segments-delays | Boolean | Variable indicating whether network segments have to be setup in network slices with certain hold/delay configuration to allow for flow prioritization. Possible values: True: Setup network segments with delay configuration for flow prioritization False: Do not setup network segments with delay configuration for flow prioritization |
| Network-segment-delay-configuration | Map | Map of network segment delay configurations. Key-value pair where a key indicates a network segment between two nodes (e.g., NFs or AFs) in the network slice and value represents the delay configuration When this map is provisioned by the application service provider, end-to-end network segment delays |

TABLE 2-continued

| Field | Type | Description |
|---|---|---|
| | | are calculated to come up with the end-to-end priority in forwarding the flow packets Similar to this map, separate maps for bandwidth configuration, throughput configuration etc. can also be provisioned by the application service provider |
| WebRTC-sla-configuration | Object | Object representing the SLA configuration for WebRTC sessions. Values for below possible fields are configured: UL and DL bit rate of WebRTC flows Maximum UL and DL packet error rate Maximum UL and DL traffic per UE Maximum UL and DL bit rate per slice Maximum latency in UL and DL directions Delay or latency budget UL and DL throughput |
| Wait-time | Integer | Amount of time to wait before measuring the WebRTC session QoS. This gives time to make sure that any slice changes from the previous iteration have taken effect. |

The electronic device 300 can determine whether the SLA of the WebRTC session close to expectations to step 1212. If the SLA of the WebRTC session is not within an acceptable range of the expected SLA, the electronic device can move to the SLA parameter with the next highest priority in step 1206.

Although FIG. 12 illustrates an example method 1200 for WebRTC QoS assurance using network slicing, various changes may be made to FIG. 12. For example, while shown as a series of steps, various steps in FIG. 12 may overlap, occur in parallel, or occur any number of times.

Figure 13:
FIG. 13 illustrates an example method for UE influenced WebRTC QoS assurance using network slices in accordance with this disclosure.
Figure 13:
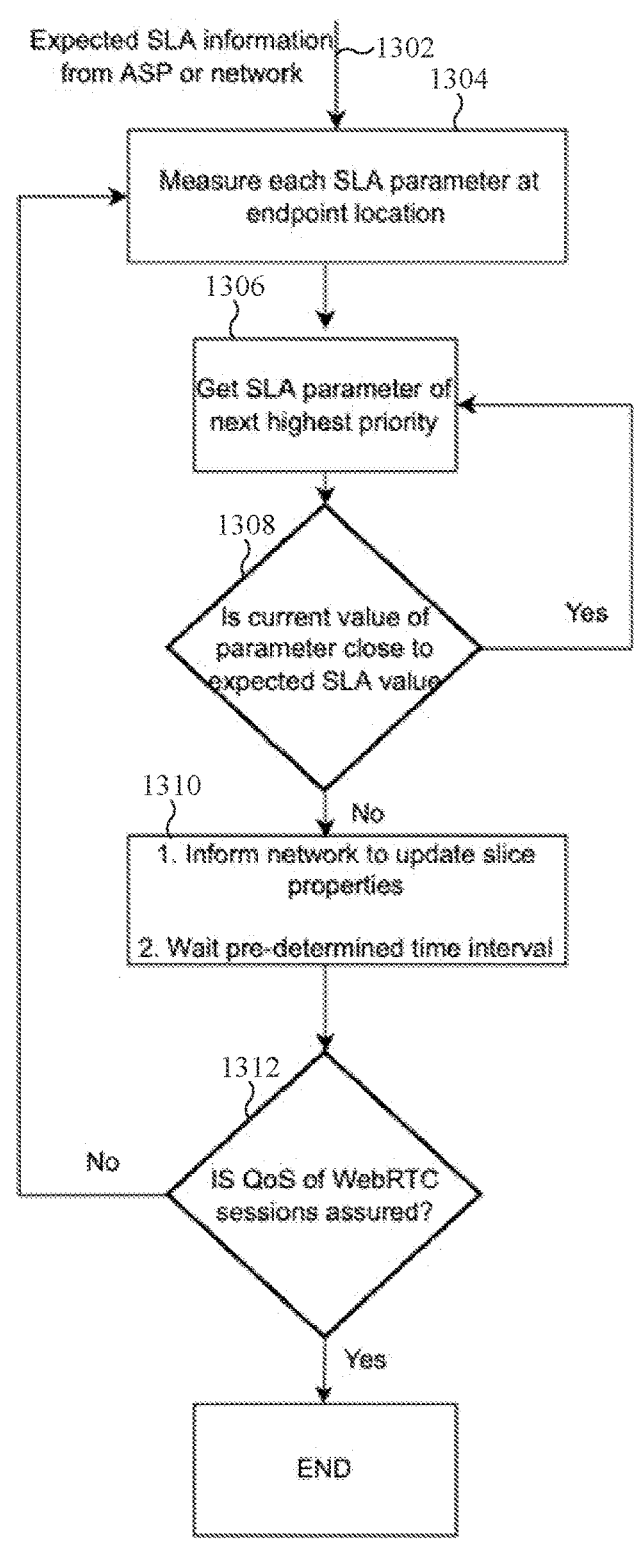

FIG. 13 illustrates an example method 1300 for UE influenced WebRTC QoS assurance using network slices in accordance with this disclosure. For ease of explanation, the method 1300 of FIG. 13 is described as being performed using the electronic devices of FIGS. 2 and 3. However, the method 1300 may be used with any other suitable system and any other suitable electronic device.

Method 1200 provides QoS assurance by the network by measuring SLA parameters and performing certain actions if computed SLA parameters do not meet the expected SLA parameter values. In method 1300, a procedure is described for UE-influenced QoS assurance for WebRTC sessions.

As shown in FIG. 13, an application service provider informs the expected SLA parameters and their priorities to the end UE or client 604 in step 1302. The parameters are similar as described in step 1202 of method 1300 shown in FIG. 12.

The electronic device 300 or UE can compute SLA parameters at the endpoint location in step 1304. The SLA parameters can be computed similar to the way they were computed by the network in step 1204.

The electronic device 300 or UE can receive an SLA parameter of a next highest priority in step 1206. The SLA parameter can be identified in a list of SLA parameters. The first time step 1206 is run using the highest priority SLA parameter.

The electronic device 300 or UE can determine whether a current value of a parameter is close to an expected SLA value in step 1308. When the current values of the SLA parameters do not come close or match the expected SLA parameter, endpoint extracts SLA parameters in decreasing order of priority and informs the network to update the slice 602 to meet the SLA of that parameter. This will result in slice property change or slice reconfiguration.

If WebRTC session meets the SLA, then the measurement is stopped in step 1212. Otherwise, the endpoint picks the next lower priority SLA parameter to influence slice property change. This continues until the complete WebRTC session meets the SLA.

When the UE informs the network in the above procedure, the adjustments described in step 1210 for each SLA parameter can be followed similarly for step 1310. The electronic device 300 can determine whether a QoS of the WebRTC session is assured in step 1312 similar to the operations in step 1212.

Although FIG. 13 illustrates an example method 1300 for UE influenced WebRTC QoS assurance using network slices, various changes may be made to FIG. 13. For example, while shown as a series of steps, various steps in FIG. 13 may overlap, occur in parallel, or occur any number of times.

Figure 14:
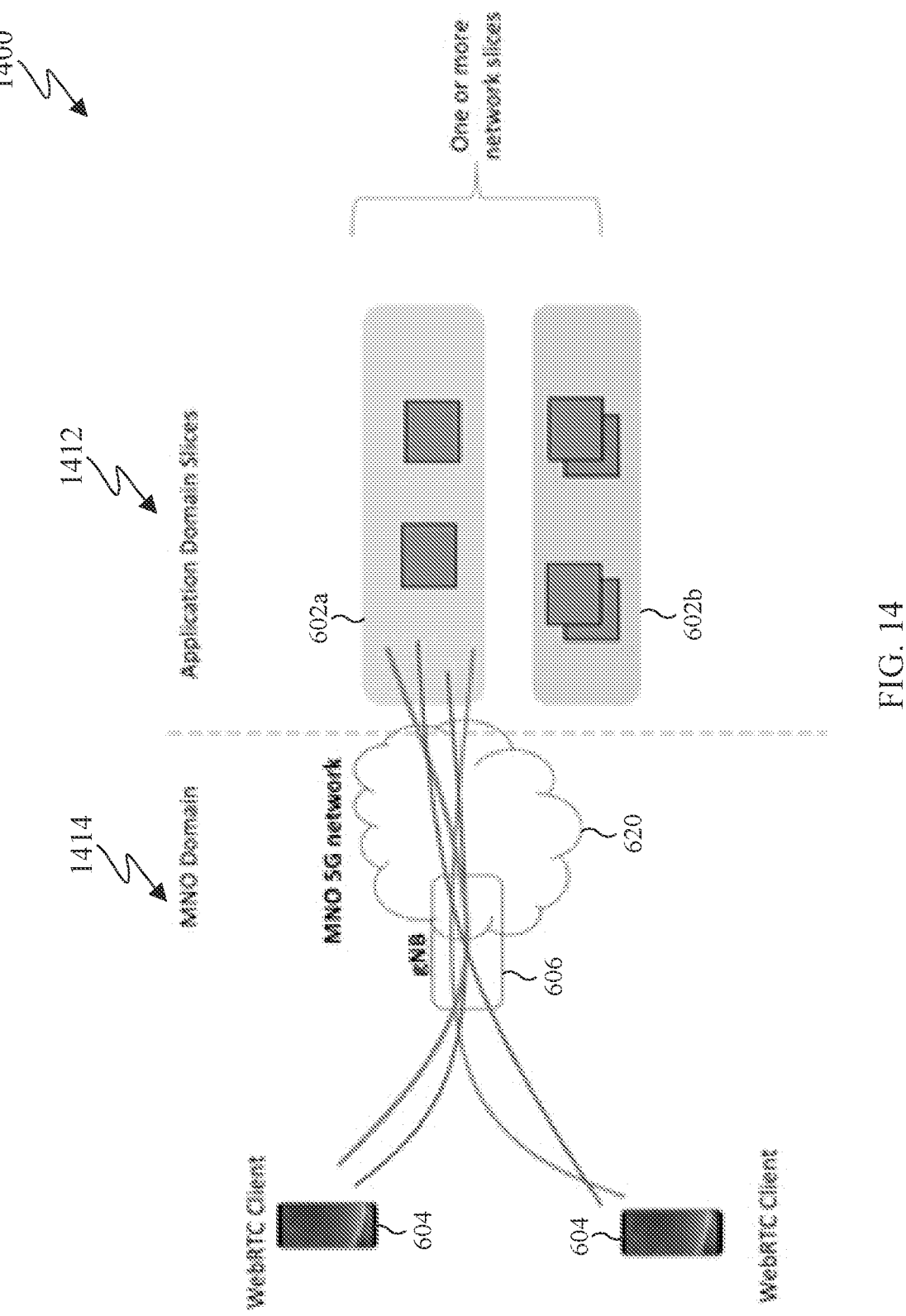
FIG. 14 illustrates an example network slicing in a remote cloud in accordance with this disclosure.
Figure 15:
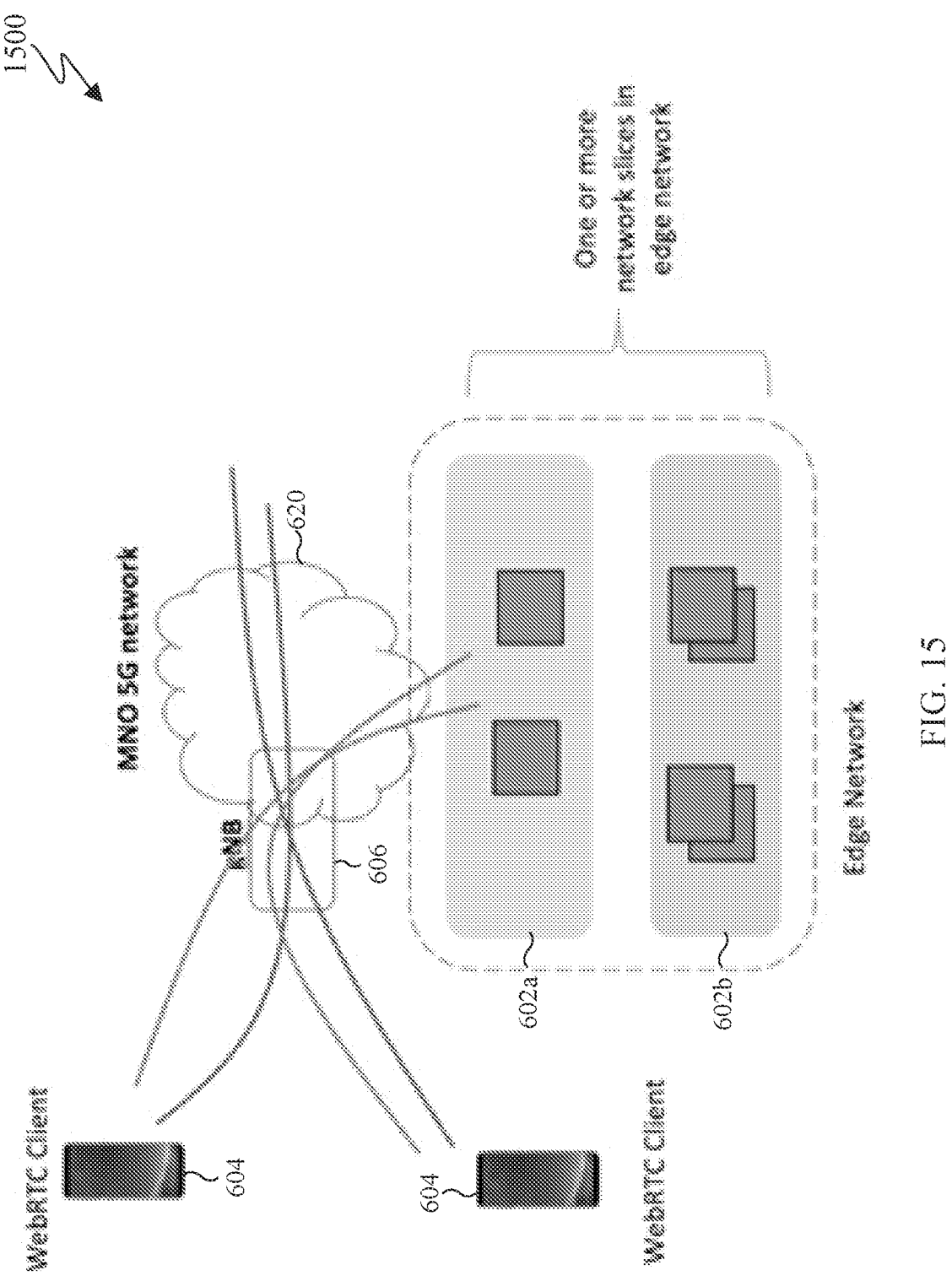
FIG. 15 illustrates an example network slicing in an edge network in accordance with this disclosure.

FIG. 14 illustrates an example network slicing 1400 in a remote cloud in accordance with this disclosure. FIG. 15 illustrates an example network slicing 1500 in an edge network in accordance with this disclosure. The embodiments of the network slicing 1400 illustrated in FIG. 14 and network slicing 1500 illustrated in FIG. 15 are for illustration only. FIGS. 14 and 15 do not limit the scope of this disclosure to any particular implementation of a media streaming system.

FIG. 14 and FIG. 15 describe network slicing only in the application domain and the edge domain, respectively. FIG. 14 shows how WebRTC traffic can be handled in a remote cloud application domain where slicing is implemented. The WebRTC traffic may get split into multiple media flows based on 5-tuple or 6-tuple information and the resultant media streams may get processed in different slices. Optionally, the same split and processing can happen in the edge network as shown in FIG. 15.

Although FIG. 14 illustrates an example network slicing 1400 and FIG. 15 illustrates an example network slicing 1500, various changes may be made to FIGS. 14 and 15. For example, the number and placement of various components of the network slicing 1400 and network slicing 1500 can vary as needed or desired. In addition, the network slicing 1400 and network slicing 1500 may be used in any other suitable media streaming process and is not limited to the specific processes described above.

Figure 16:
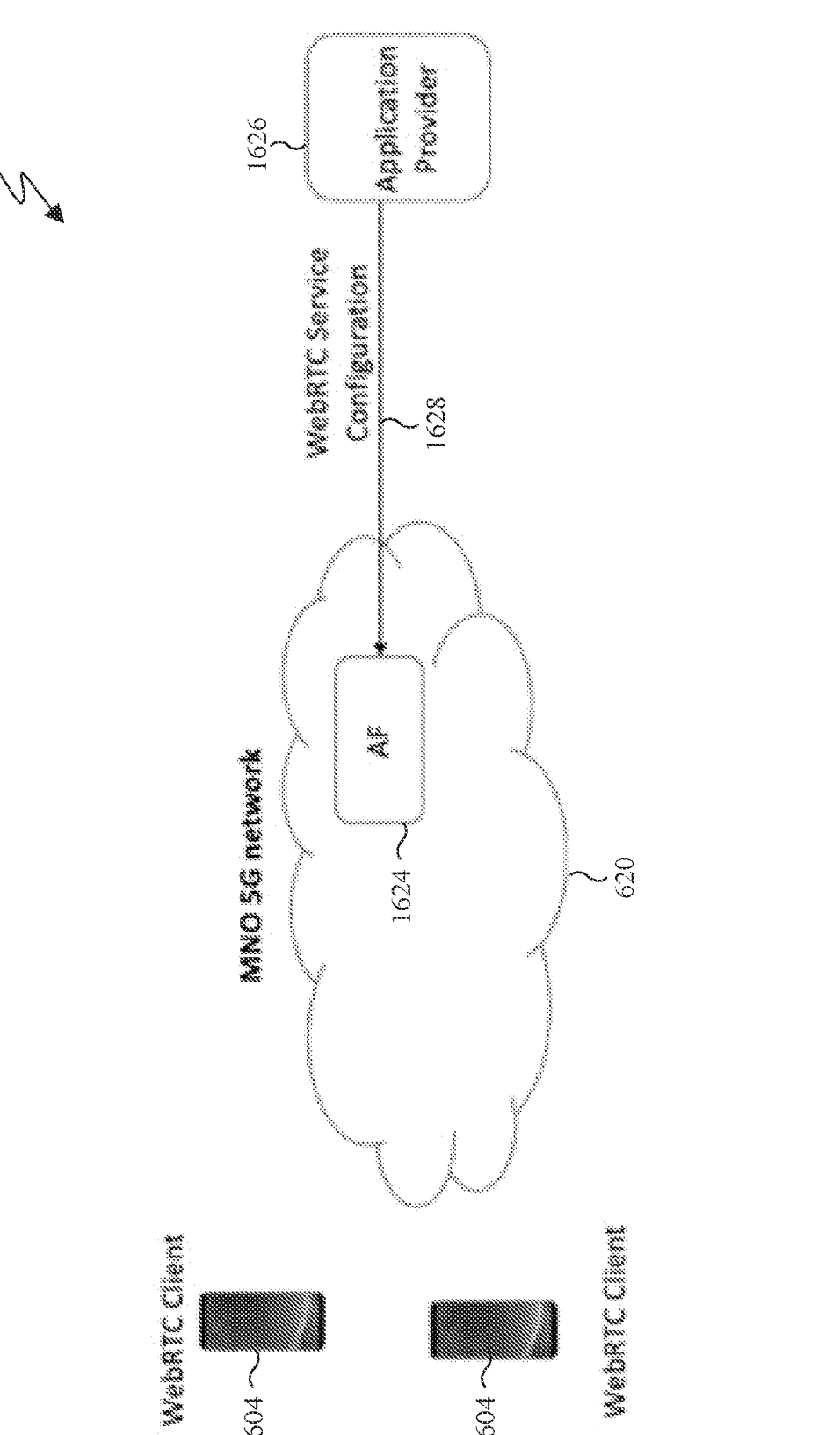
FIG. 16 illustrates an example WebRTC service configuration in accordance with this disclosure.

FIG. 16 illustrates an example WebRTC service configuration 1600 in accordance with this disclosure. The embodiment of the WebRTC service configuration 1600 illustrated in FIG. 16 is for illustration only. FIG. 16 does not limit the scope of this disclosure to any particular implementation of a media streaming system.

FIG. 16 shows the WebRTC service configuration 1600 by the application provider 1626 in the MNO network 620.

The application provider 1626 configures WebRTC service at an application function (AF) 1624 in the MNO network 620. The AF 1624 could be the 5G RTC AF as specified in TS 26.506. The WebRTC service configuration information 1628 could have the following information shown in TABLE 3

TABLE 3

| Information field | Description |
|---|---|
| User-list | List of user identities (e.g., 5G user identities) that can access the WebRTC service. |
| auth. mechanism | Mechanism for authentication WebRTC service users. Possible mechanisms could include: Digest: Simple digest authentication using password-based authentication UDM: Users' authentication information is based on user subscription information in user management function (e.g., 5G UDM) Token-based: Users are provided with auth. tokens using an offline mechanism, and user WebRTC endpoints are required to send such token information along with their WebRTC connection requests. When the AF is configured with this information, a list of valid tokens is securely sent to the AF. Alternatively, the application provider can provide an entry point information (e.g., URL) of a web resource (e.g., file), directory information (e.g., auth. database) to fetch the valid tokens. Application provider will also securely send the auth. credentials to access to the above web resource or auth. database. |
| QoS-configuration | Information of QoS requirements for setting up resources in the operator network to facilitate WebRTC services. Such information could include the parameters such as: Minimum bandwidth: Minimum amount of bandwidth to be allocated to WebRTC session Minimum throughput: Minimum amount of throughput for a WebRTC session Packet loss rate: Maximum packet loss rate for a WebRTC session Maximum latency: Maximum end-to-end latency for a WebRTC session All of the above values can be provided separately for downlink and uplink direction. |
| WebRTC-signaling-endpoint | End point information of WebRTC signaling server. In case the signaling server is provided by application provider, the endpoint information has the information about how to reach the application provider provisioned signaling server. In case the application provider wants the MNO to setup a signaling server, this information is empty in the service configuration information. When the AF receives such a service configuration including empty signaling server information, the AF provisions a WebRTC signaling server and will inform the application provider of the endpoint information of this server. |
| Helper-functions | An array of objects where each object points to the endpoint information of a helper function such as a STUN server, TURN server, MCU etc. In case the helper functions are provided by application provider, the endpoint information in each object has the information about how to reach the function. In case the application provider wants the MNO to setup the required helper functions, this information is empty in the service configuration information. When the AF receives such a service configuration including empty helper-function information, the AF provisions the required helper functions and will inform the application provider of the endpoint information of these functions. |

Although FIG. 16 illustrates a WebRTC service configuration 1600, various changes may be made to FIG. 16. For example, the number and placement of various components of the WebRTC service configuration 1600 can vary as needed or desired. In addition, the WebRTC service configuration 1600 may be used in any other suitable media streaming process and is not limited to the specific processes described above.

Figure 17:
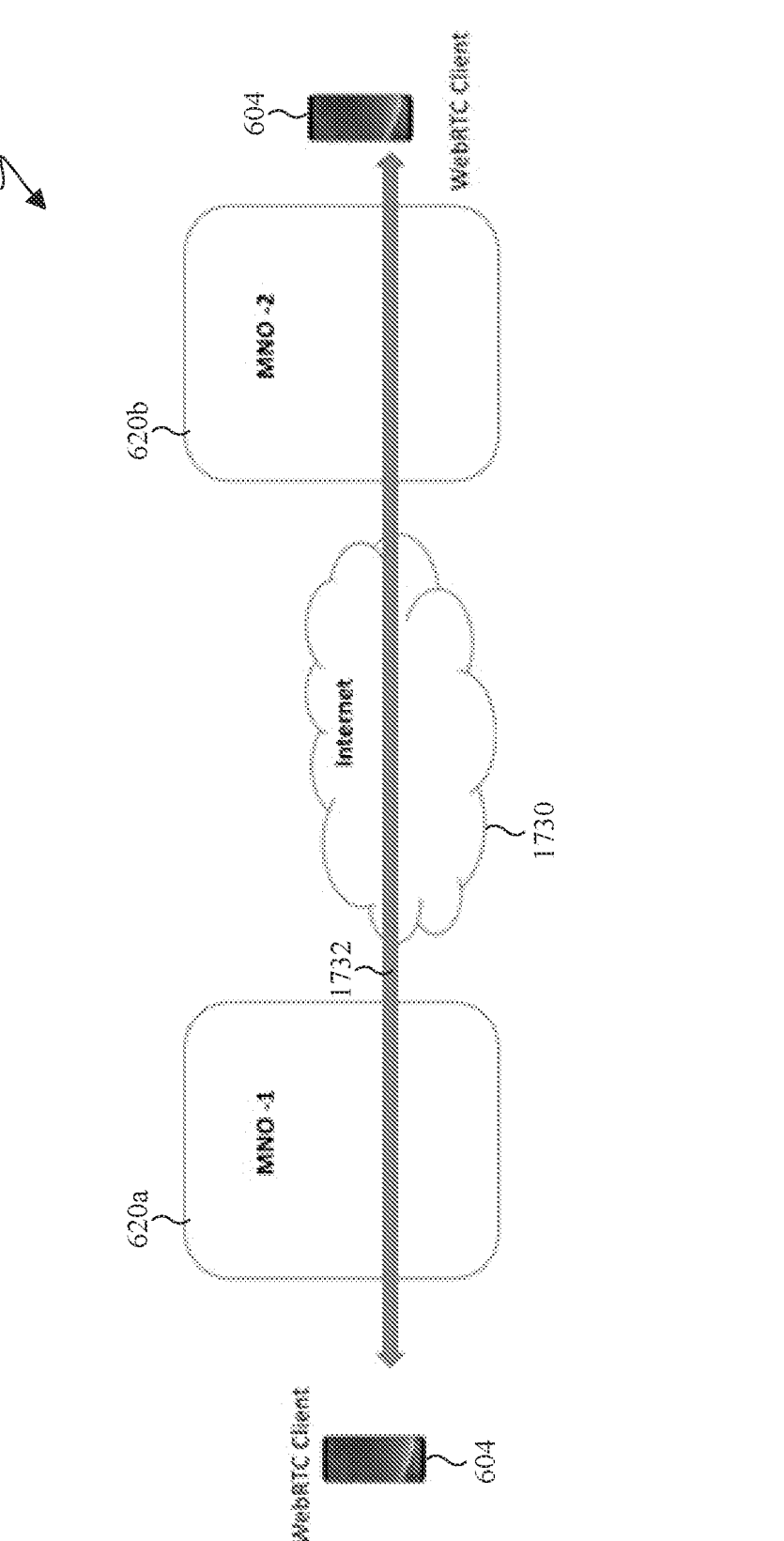
FIG. 17 illustrates an example inter mobile network operator (MNO) WebRTC session in accordance with this disclosure.

FIG. 17 illustrates an example inter mobile network operator (MNO) WebRTC session 1700 in accordance with this disclosure. The embodiment of the MNO WebRTC session 1700 illustrated in FIG. 17 is for illustration only. FIG. 17 does not limit the scope of this disclosure to any particular implementation of a media streaming system.

As shown in FIG. 17, simple WebRTC session 1732 can connect clients 604 of two different MNOs 620a and 620b. When WebRTC services are provided by an application provider through a network operator, clients 604 belonging to different network operators are able to have a WebRTC session 1732. A WebRTC session 1732 can be established between endpoints or clients 604 in two different MNO networks 620a and 620b. To facilitate inter-MNO WebRTC sessions 1732, WebRTC signaling servers and helper functions, shown in FIG. 18, can be utilized. Options for the WebRTC signaling server are shown in TABLE 4.

Helper functions can be deployed in an external application provider network or in one of the MNO networks 620a and 620b.

If the WebRTC signaling server 1834 is deployed in the external application provider network, then the helper functions (e.g., TURN server, STUN server, MCU etc.) can be deployed either in the external application provider or in the MNO network (based on assistance from the application provider). If the WebRTC signaling server 1834 is deployed in the MNO network 620, then the helper functions (e.g., TURN server, STUN server, MCU etc.) are deployed inside the MNO network 620.

Figure 18:
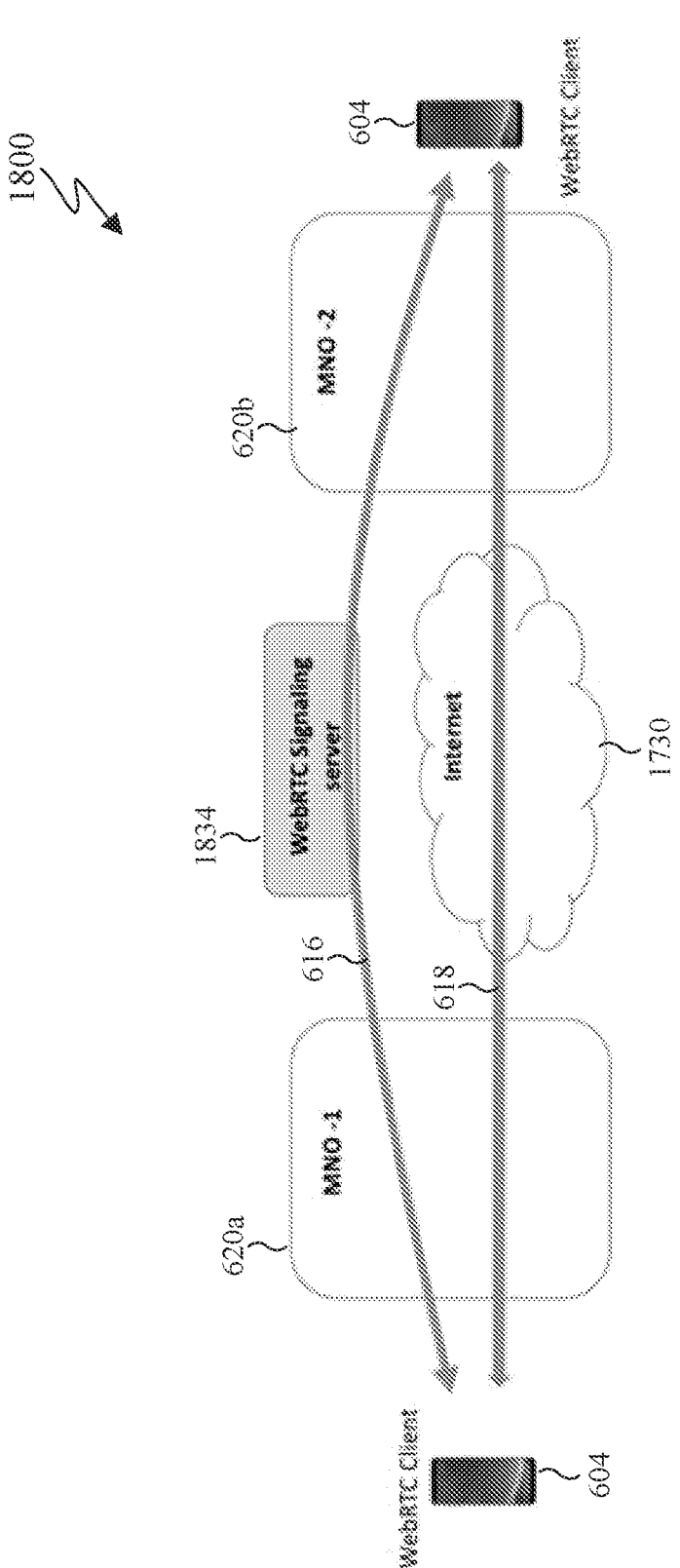
FIG. 18 illustrates an example singular WebRTC signaling for multiple MNOs in accordance with this disclosure.

Although FIG. 18 illustrates an example singular WebRTC signaling 1800 for multiple MNOs, various changes may be made to FIG. 18. For example, number and placement of various components of the singular WebRTC signaling 1800 can vary as needed or desired. In addition, the singular WebRTC signaling 1800 may be used in any other suitable media streaming process and is not limited to the specific processes described above.

Figure 19:
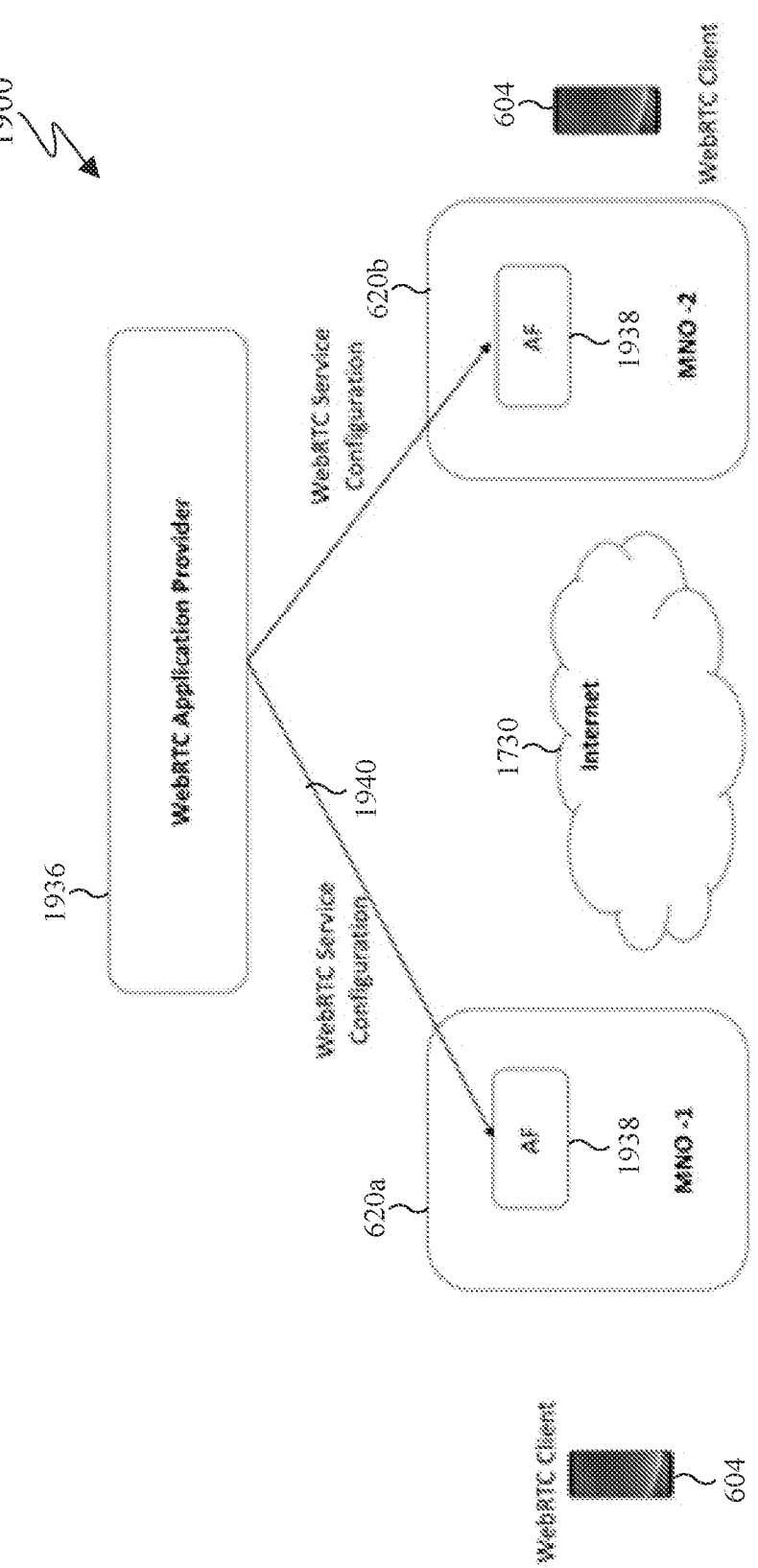
FIG. 19 illustrates an example service configuration for inter-MNO-WebRTC service in accordance with this disclosure.

FIG. 19 illustrates an example service configuration 1900 for inter-MNO-WebRTC service in accordance with this disclosure. The embodiment of the service configuration

TABLE 4

| MNO-1 | MNO-2 |
|---|---|
| WebRTC signaling server is provisioned by external application provider for MNO-1 users in external domain | WebRTC signaling server is provisioned by external application provider for MNO-2 users in external domain |
| WebRTC signaling server is provisioned by external application provider for MNO-1 users in external domain | WebRTC signaling server is provisioned by MNO-2 for MNO-2 users inside the MNO-2 domain |
| WebRTC signaling server is provisioned by MNO-1 for MNO-1 users inside the MNO-1 domain | WebRTC signaling server is provisioned by external application provider for MNO-2 users in external domain |
| WebRTC signaling server is provisioned by MNO-1 for MNO-1 users inside the MNO-1 domain | WebRTC signaling server is provisioned by MNO-2 for MNO-2 users inside the MNO-2 domain |

Although FIG. 17 illustrates an example MNO WebRTC session 1700, various changes may be made to FIG. 17. For example, the number and placement of various components of the MNO WebRTC session 1700 can vary as needed or desired. In addition, the MNO WebRTC session 1700 may be used in any other suitable media streaming process and is not limited to the specific processes described above.

FIG. 18 illustrates an example singular WebRTC signaling 1800 for multiple MNOs in accordance with this disclosure. The embodiment of the singular WebRTC signaling 1800 illustrated in FIG. 18 is for illustration only. FIG. 18 does not limit the scope of this disclosure to any particular implementation of a media streaming system.

As shown in FIG. 18, an external WebRTC signaling server 1834 in two MNO networks 620a and 620b can provide signaling services. Helper functions can be utilized for deployment of the WebRTC signaling server 1834.

1900 illustrated in FIG. 19 is for illustration only. FIG. 19 does not limit the scope of this disclosure to any particular implementation of a media streaming system.

As shown in FIG. 19, the service configuration 1900 for inter-MNO services can have the WebRTC application provider 1936 separately configure the WebRTC services in different MNO networks 620a and 620n. The service configuration information 1940 for each of the MNO 620a and 620b is as described earlier in the disclosure. In addition, the following information is also provided to each of the MNOs 620 could have the following information shown in TABLE 5.

TABLE 5

| Information field | Description |
| --- | --- |
| Peer-WebRTC-signaling-server | Endpoint information of WebRTC signaling servers of peer MNOs. If the application provider has requisite authority to provide WebRTC services in more than one MNO, this information is an array of objects, where each object provides information about the WebRTC signaling server corresponding to each MNO that the application provider can configure a WebRTC service for. When the AF in MNO receives such an information, it can communicate with the WebRTC signaling server in any other MNO network to setup signaling sessions. |
| Peer-helper-functions | Endpoint information of WebRTC helper functions of peer MNOs. This information is an array of objects, where each object provides information about the WebRTC helper functions corresponding to each MNO that the application provider can configure a WebRTC service for. When the AF in MNO receives such an information, it can communicate to its MNO users that the media for WebRTC sessions may arrive from these peer MNO helper functions. |

The service configuration from the application provider at the application function to manage the QoS of WebRTC sessions also includes the following information shown in TABLE 6.

TABLE 6

| QoS configuration information | Description |
| --- | --- |
| classification-information | Describes how different media flows of WebRTC sessions have to be classified. Possible values: 5-tuple: Uses 5-tuple information (source IP, source port, destination IP, destination port, protocol) for classifying flows DSCP: Use classification based on DSCP packet marking by the WebRTC endpoint MAC address: Classify flows based on MAC address One or more combination of these can be used for classification information |
| policing-information | Information to limit traffic at the ingress node at different network segments. Such information includes the following: Max/min/avg. bit rate of IP/media flows in two directions - uplink or downlink Max/min/avg. throughput of IP/media flows in two directions - uplink or downlink Max/min/avg bandwidth of IP/media flows in two directions - uplink or downlink Max/min/avg. packet loss rate of IP/media flows in two directions - uplink or downlink The above information is provided for network devices at each of the following network subnets such as the following: Radio interface Fronthaul Mid-haul Backhaul Backhaul N4 subnet in 5G network N6 subnet in 5G network N1 subnet in 5G network N2 subnet in 5G network N9 subnet in 5G network |
| propagation-information | Information that dictates how the flow/packet/frame marking should be updated from one layer to another or from one type of network to another type of network. Includes information such as: Application priority –> DSCP marking DSCP –> 5QI packet parking defined in TS 23501 5QI –> M1QoSSpecification defined in TS 26501 and TS 26512 MPLS –> DSCP DSCP –> Ethernet p-bits |
| metering-information | Information to limit traffic at the egress node at different network segments. Such information includes the following: Max/min/avg. bit rate of IP/media flows in two directions - uplink or downlink |

TABLE 6-continued

| QoS configuration information | Description |
| --- | --- |
| | Max/min/avg. throughput of IP/media flows in two directions - uplink or downlink |
| | Max/min/avg bandwidth of IP/media flows in two directions - uplink or downlink |
| | Max/min/avg. packet loss rate of IP/media flows in two directions - uplink or downlink |
| | The above information is provided for network devices at each of the following network subnets such as the following: |
| | Radio interface |
| | Fronthaul |
| | Mid-haul |
| | Backhaul |
| | Backhaul |
| | N4 subnet in 5G network |
| | N6 subnet in 5G network |
| | N1 subnet in 5G network |
| | N2 subnet in 5G network |
| | N9 subnet in 5G network |
| queuing-information | Information about queue management. Such information includes: |
| | Queuing-schema: Type of queuing schema |
| | Number of queues: Number of queues to implement for this schema |
| | Buffer-sizes: Buffer sizes for each of the queue to be setup |
| | Congestion level: Level of each queue capacity before congestion avoidance mechanisms kicks in |
| | Congestion-management: Procedures to adopt after congestion is observed |
| | Queue-schedulers: Queue scheduling mechanisms such as priority queuing, weighted fair queuing, round-robin etc. |
| | Queue delay: Amount of delay to be configured for each port |
| adopt-fec | Boolean variable indicating FEC mechanisms should be used for error correction |
| fec-method | Type of FEC method to use for error correction |

The information from TABLES 5 and 6 can be configured by the application service provider 1936 at the application function 1938 for QoS management of WebRTC sessions. When the AF 1938 receives such information, the AF 1938 can configure all the network devices with the given QoS schema configuration information. For configuration of RAN network entities, the AF 1938 can inform the RAN controller devices using the communication facilities provided for core network functions. When the RAN controller devices receive this information, the controller can update RAN nodes in different RAN subnets with QoS configuration received from the AF 1938 in core network.

After the configuration of QoS information, the network devices can start the QoS management of WebRTC sessions based on the configured parameter values. At regular intervals, each of the network devices can inform the QoS status information to the AF 1938. For RAN nodes, the information will be delivered to the AF 1938 through the RAN node. The interval after which the QoS status information is to be delivered to the AF 1938 is configured by the application provider using a monitoring-interval, which is an interval after which the QoS status information is reported to the AF.

The QoS status information reported to the AF 1938 from each network device in each network subnet can include report-time and report-information. The report-time is a time of status report. The report-information can include a classification-status, a policing-status, a propagation-status, a metering-status, and a queuing-status. The classification-status is a list of all classifications based on configured classification information from last time interval to current time interval. The policing-status is an average bitrate, throughput, bandwidth, packet loss rate for each of the flows from last time interval to current time interval. The propagation-status is a type of propagations applied for each of the flows from last time interval to current time interval. The metering-status is a metering applied to different flows from last time interval to current time interval. The queuing-status is information about current status of each queue including queuing schema, number of queues, queue buffer sizes, current and average congestion levels, scheduling status information, current and avg. delay information etc.

Based on the above status information, the AF 1938 can have complete information of the current QoS configuration and status information in the MNO network 620. The AF 1938 can update the QoS configuration information, using the same service configuration procedure described earlier in the disclosure, depending on the received QoS status information.

Although FIG. 19 illustrates an example service configuration 1900 for inter-MNO-WebRTC service, various changes may be made to FIG. 19. For example, the number and placement of various components of the service configuration 1900 can vary as needed or desired. In addition, the service configuration 1900 may be used in any other suitable media streaming process and is not limited to the specific processes described above.

Figure 20:
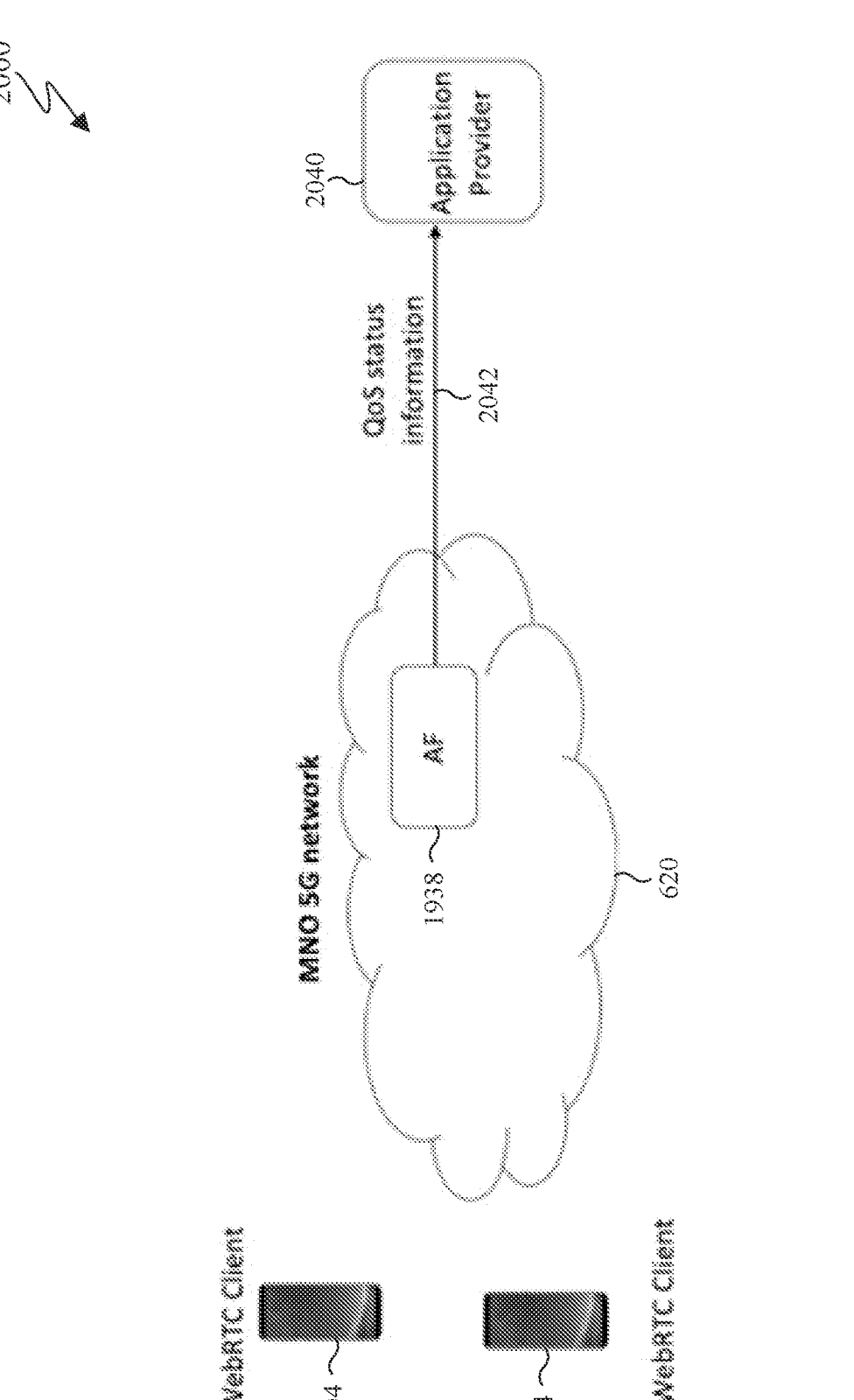
FIG. 20 illustrates an example QoS status notification of WebRTC services to an application provider in accordance with this disclosure.

FIG. 20 illustrates an example QoS status notification 2000 of WebRTC services to an application provider 2040 in accordance with this disclosure. The embodiment of the QoS status notification 2000 illustrated in FIG. 20 is for illustration only. FIG. 20 does not limit the scope of this disclosure to any particular implementation of a media streaming system.

As shown in FIG. 20, the QoS status information 2042 received from different network devices to the AF 1938 can be exchanged with the application provider 2040. With the QoS status information 2042, the application provider 2040 has complete knowledge of the current QoS for all WebRTC sessions in the MNO network 620.

Although FIG. 20 illustrates QoS status notification 2000 of WebRTC services to an application provider, various changes may be made to FIG. 20. For example, the number and placement of various components of the QoS status notification 2000 can vary as needed or desired. In addition, the QoS status notification 2000 may be used in any other suitable media streaming process and is not limited to the specific processes described above.

Figure 21:
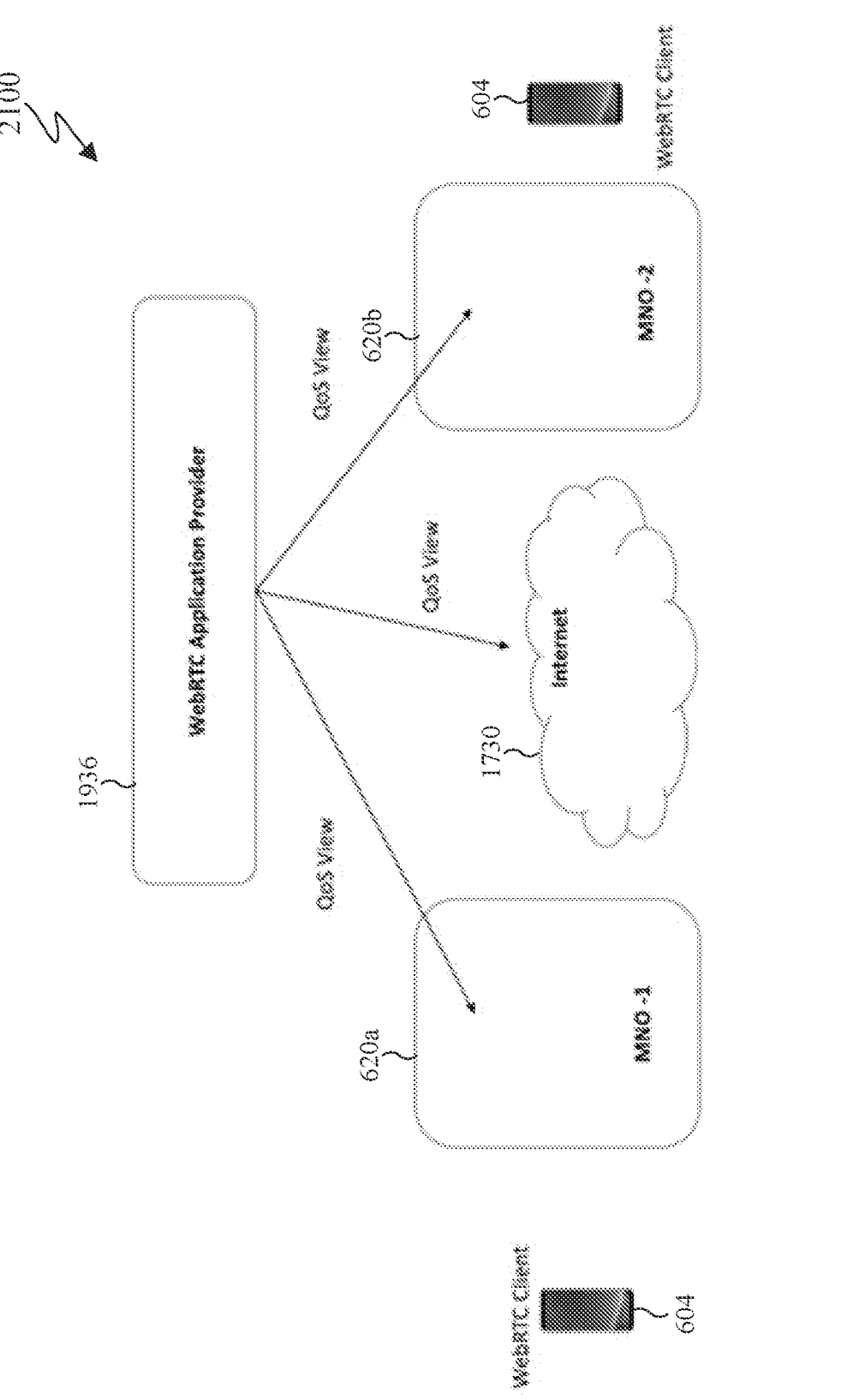
FIG. 21 illustrates an example end-to-end view of QOS in accordance with this disclosure.

FIG. 21 illustrates an example end-to-end view 2100 of QOS in accordance with this disclosure. The embodiment of the end-to-end view 2100 illustrated in FIG. 21 is for illustration only. FIG. 21 does not limit the scope of this disclosure to any particular implementation of a media streaming system.

As shown in FIG. 21, the WebRTC application provider 1936 has an end-to-end view 2100 of QoS. After the application service provider 1936 receives the QoS status information, the application service provider 1936 has a complete end to end view of current QoS status and the configured QoS information. For example, for inter-MNO WebRTC sessions described earlier in the disclosure, with QoS status information from MNO-1 and MNO-2, the WebRTC application provider has QoS view of MNO-1, MNO-2, and the intermediate transport (e.g., Internet) between those two MNOs.

Although FIG. 21 illustrates an example end-to-end view 2100 of QOS, various changes may be made to FIG. 21. For example, the number and placement of various components of the end-to-end view 2100 can vary as needed or desired. In addition, the end-to-end view 2100 may be used in any other suitable media streaming process and is not limited to the specific processes described above.

Figure 22:
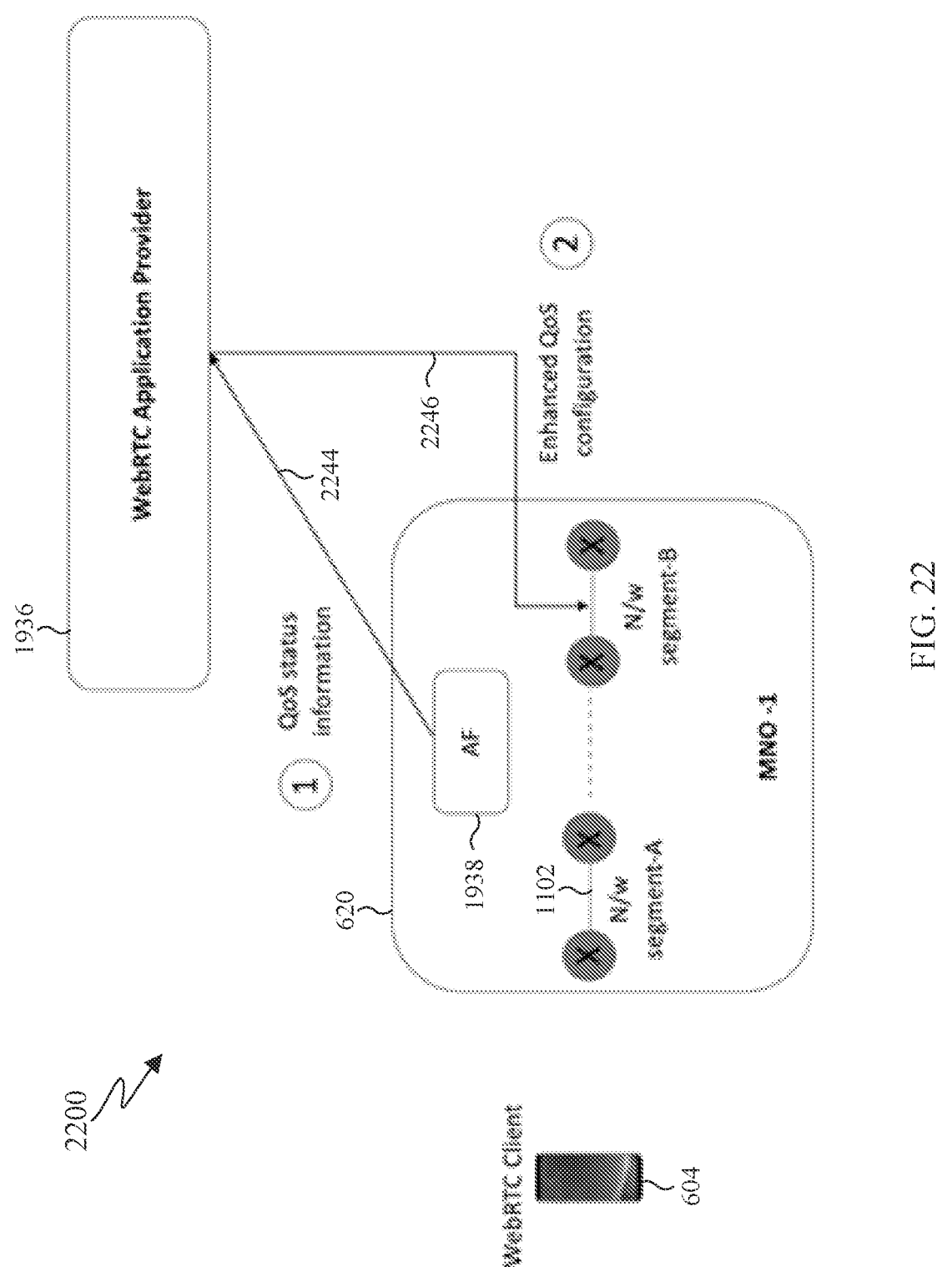
FIG. 22 illustrates an example QoS compensation at a network segment due to QoS degradation at a different network segment in accordance with this disclosure.

FIG. 22 illustrates an example QoS compensation 2200 at a network segment due to QoS degradation at a different network segment in accordance with this disclosure. The embodiment of the QoS compensation 2200 illustrated in FIG. 22 is for illustration only. FIG. 22 does not limit the scope of this disclosure to any particular implementation of a media streaming system.

Once the application service provider has end-to-end view 2100 of QoS for different MNO networks 620, the application service provider 1936 can compensate for QoS problems at one location with enhanced QoS configuration 2246 at a different location.

As shown in FIG. 22, after the application provider 1936 can receive the QoS status information 2244 and the application provider 1936 observes that the QoS is degraded at a first network segment 1102 (e.g., network segment-A), then the application provider 1936 can provide an updated QoS configuration 2246 for a second network segment (e.g., network segment-B) so end-to-end QoS is maintained for the WebRTC sessions. The QoS compensation may not only happen for network segments 1102, but for all the network devices and network functions that are involved in QoS management of WebRTC sessions.

Although FIG. 22 illustrates an example QoS compensation 2200, various changes may be made to FIG. 22. For example, number and placement of various components of the QoS compensation 2200 can vary as needed or desired. In addition, the QoS compensation 2200 may be used in any other suitable media streaming process and is not limited to the specific processes described above.

Figure 23:
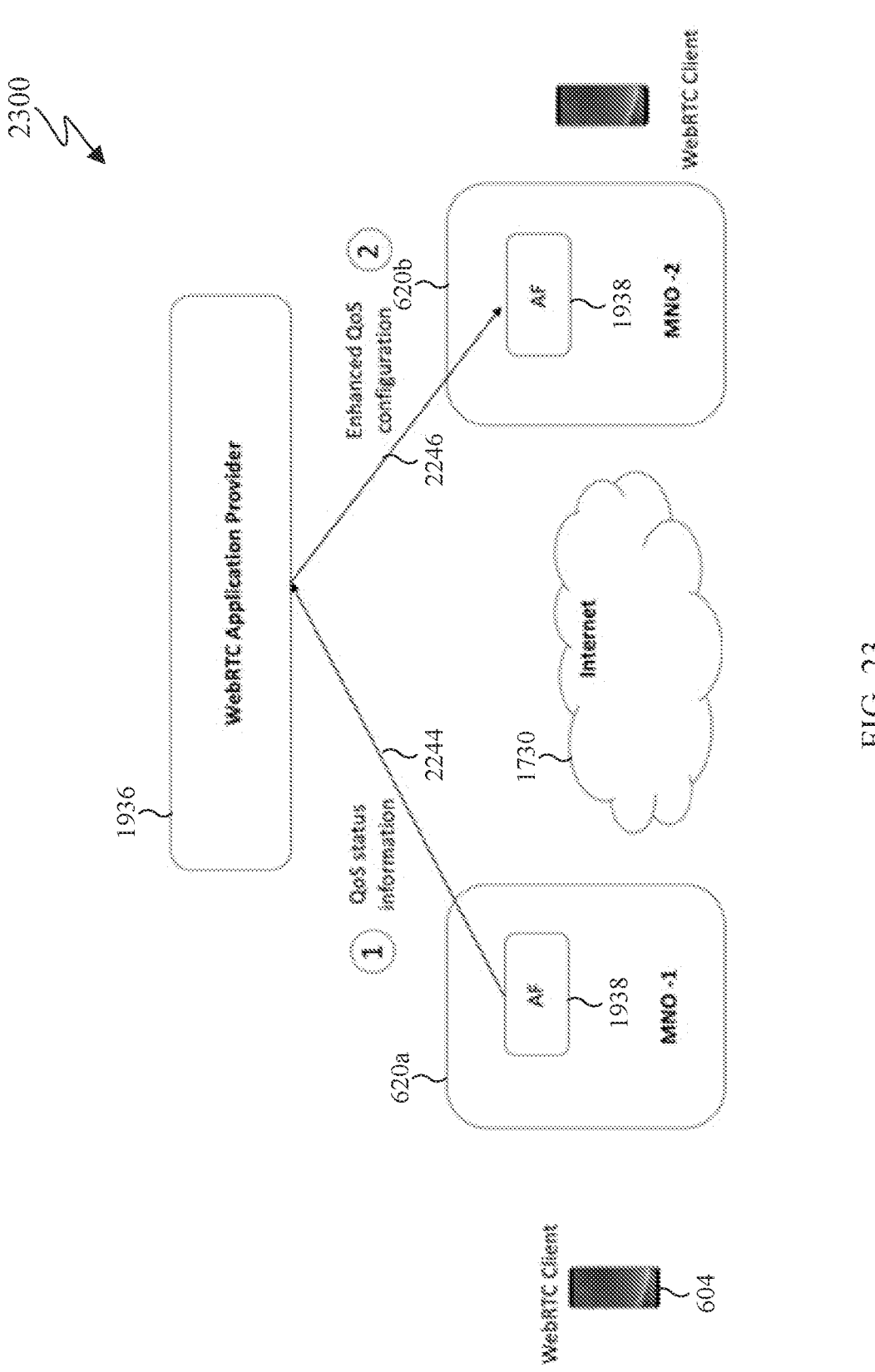
FIG. 23 illustrates an example QoS compensation at different MNO networks in accordance with this disclosure.

FIG. 23 illustrates an example QoS compensation 2300 at different MNO networks in accordance with this disclosure.

The embodiment of the QoS compensation 2300 illustrated in FIG. 23 is for illustration only. FIG. 23 does not limit the scope of this disclosure to any particular implementation of a media streaming system.

As shown in FIG. 23, QoS compensation 2300 can also happen at different MNOs. For example, for the inter-MNO WebRTC services. The QoS compensation 2300 can happen in different MNOs 620*a* and 620*b*. When the application provider 1936 receives information that QoS degrading in MNO-1 620*a*, then the application provider 1936 can provide updated QoS configuration 2246 for network devices/functions/segments in MNO-2 620*b* so end-to-end QoS for WebRTC sessions is maintained. The QoS compensation 2300 can be achieved using any of the methods deemed necessary for the application provider as described below in TABLE 7.

TABLE 7

| Observed QoS degradation in one location/device | QoS compensation method in another location/device |
|---|---|
| Unable to keep up policing | Use any of the following methods with updated configuration information for QoS compensation: classification policing propagation Queuing Metering |
| Unable to keep up propagation | Use any of the following methods with updated configuration information for QoS compensation: classification policing propagation Queuing Metering |
| Unable to maintain proper queuing mechanisms | Use any of the following methods with updated configuration information for QoS compensation: classification policing propagation Queuing Metering |
| Unable to maintain proper metering | Use any of the following methods with updated configuration information for QoS compensation: classification policing propagation Queuing Metering |

For example, a QoS compensation method that can be directly applied includes determining if policing is lagging in MNO-1, and providing an updated QoS configuration with more stricter policing in MNO-2 that can preserve end-to-end QoS of WebRTC sessions.

Another QoS compensation method that can be directly applied includes determining if sufficient queuing cannot be applied in MNO-1, and providing an updated QoS configuration (e.g., number of queues, queue lengths) with more strict/lenient queue policies in MNO-2 that can be applied to preserve end-to-end QoS. Additionally, a QoS compensation method can be directly applied using classification-information from MNO-2 for better QoS management for same flows in MNO-2 or vice versa.

In addition to using above QoS schemes, QoS compensation method 2300 can also be based on media flow priorities assigned by the WebRTC client 604. The application function 1938 can get notified by the WebRTC client

604 about the priorities of different media flows. This information can then be forwarded to the application provider 1936. The application provider 1936 can receive media flow priority information from multiple MNOs. The QoS compensation 2300 based on media flow priorities can then happen differently for a WebRTC session run between two user in the same MNO 620 and a WebRTC session spanning more than one MNO 620.

When a WebRTC session is run between two clients 604 in the same MNO 620, the priority information of media flows at one WebRTC client 604 can influence the QoS configuration of different network segments/devices/links. For a WebRTC session spanning more than one MNO 620 (for example, for the inter MNO WebRTC services described earlier in the disclosure), the QoS re-configuration can happen in any of the MNOs 620.

QoS reconfiguration based on media flow priorities is possible by higher policing and metering values for higher priority media flows and additional queues and enhanced queue configuration for higher priority media flows. In addition to above methods, based on an end-to-end view 2100 of QoS information, the application provider 1936 is in a position to infer QoS degradation because of the Internet 1730 between the two MNOs 620a and 620b. Since the Internet 1730 is a best effort QoS service, it is highly likely that the Internet 1730 between the two MNOs 620a and 620b is the weakest link in end-to-end QoS management. The application functions 1938 in either MNOs 620a and 620b and the application provider 1936 do not have control of QoS configuration in the Internet 1730. To compensate for degradation in QoS because of Internet link between the two MNOs 620a and 620b, the QoS compensation methods defined in this disclosure can be applied in both the MNOs to have the closest possible end-to-end QoS as required by the application provider 1936.

Although FIG. 23 illustrates an example QoS compensation 2300 at different MNO networks, various changes may be made to FIG. 23. For example, the number and placement of various components of the QoS compensation 2300 can vary as needed or desired. In addition, the QoS compensation 2300 may be used in any other suitable media streaming process and is not limited to the specific processes described above.

Figure 24:
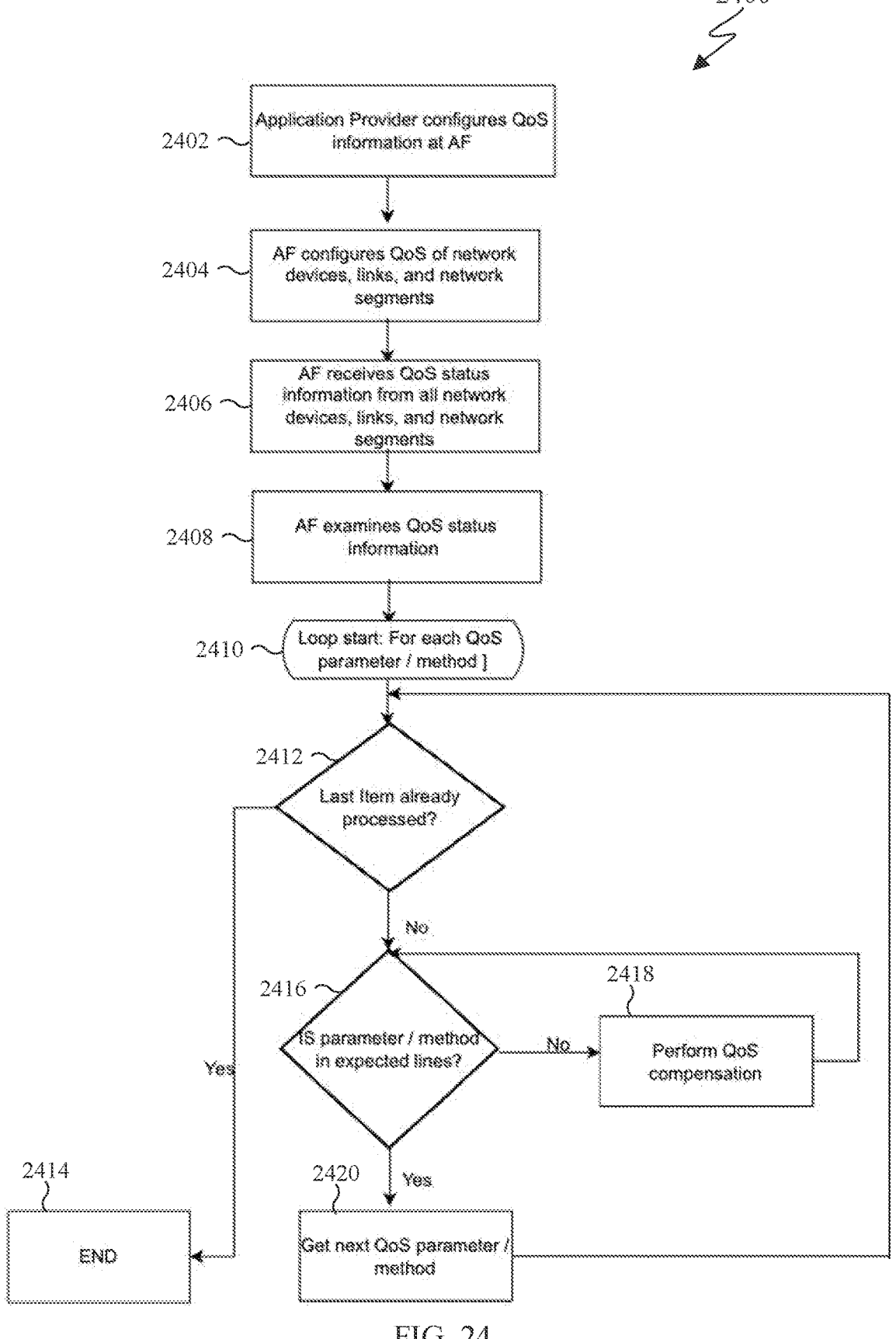
FIG. 24 illustrates an example method for QoS compensation at different MNO networks in accordance with this disclosure.
Figure 26:
FIG. 26 illustrates an example method for QoS assurance for WebRTC sessions in 5G networks according to this disclosure.
Figure 26:
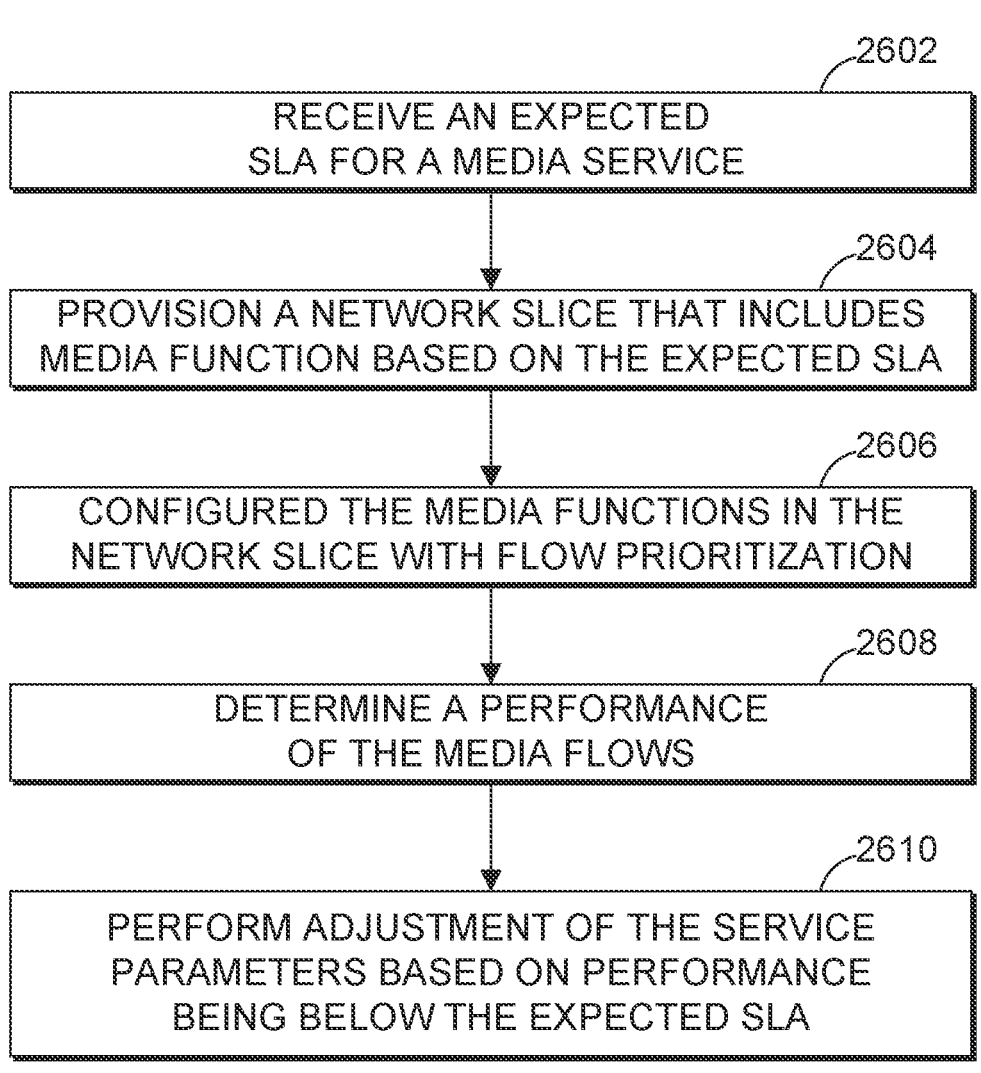

FIG. 24 illustrates an example method 2400 for QoS compensation at different MNO networks in accordance with this disclosure. For ease of explanation, the method 2400 of FIG. 26 is described as being performed using the application provider 1936 and the AF 1938 of FIG. 19. However, the method 2400 may be used with any other suitable system and any other suitable electronic device.

As shown in FIG. 24, end-to-end QoS management procedure can be provided for WebRTC sessions. A WebRTC application provider 1936 (service provider) can configure QoS information at an AF 1938 in step 2402. The AF 1938 can configure the QoS parameters of each of the network devices, links, subnets in step 2404.

The AF 1938 can receive QoS status information from each of the above entities in step 2406. The AF 1938 can examine the status information for each of the parameters, configuration options, QoS schemes, and methods in step 2408. The AF 1938 initiates a loop of steps 2412-2420 for each of the QoS parameter, configuration option, QoS scheme, and method in step 2410. The AF 1938 can determine whether a last item has been processed to continue or end the method in step 2412.

The AF 1938 can determine whether QoS parameter, configuration option, QoS scheme, and method are in expected lines (e.g., satisfying Service level specifications?) in step 2416. If any QoS parameter/configuration option/QoS scheme/method is not performing as required or if the QoS is degraded, then the AF 1938 can perform QoS compensation in step 2418. These steps are performed until all the parameters, configuration options, QoS schemes, and methods are examined, where a next QoS parameter, configuration options, QoS schemes, and methods are retrieved in step 2420.

After all the QoS parameters, configuration options, QoS schemes, and methods are examined, if the end-to-end QoS is maintained, then the AF 1938 continues QoS monitoring. Otherwise, the AF 1938 can continue the re-configuration of QoS parameters, configuration options, QoS schemes, and methods.

Although FIG. 24 illustrates one example of a method 2400 for QoS assurance for WebRTC sessions in 5G networks, various changes may be made to FIG. 24. For example, while shown as a series of steps, various steps in FIG. 24 may overlap, occur in parallel, or occur any number of times.

Figure 25:
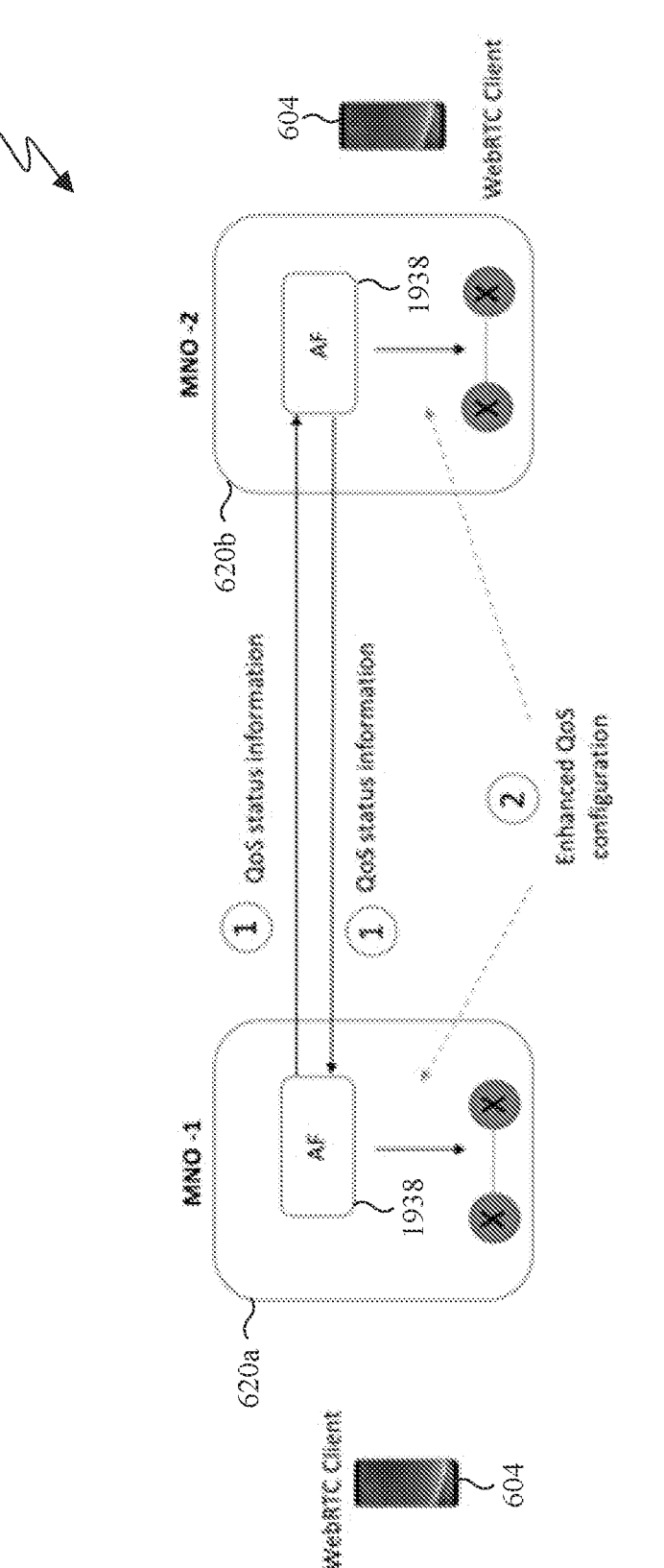
FIG. 25 illustrates an example QoS compensation at different MNO networks in accordance with this disclosure.

FIG. 25 illustrates an example QoS compensation 2500 at different MNO networks in accordance with this disclosure. The embodiment of the QoS compensation 2500 illustrated in FIG. 25 is for illustration only. FIG. 25 does not limit the scope of this disclosure to any particular implementation of a media streaming system.

Methods for QoS management include where in the application function 1938 in the network receives QoS status information and forwards it to the application provider 1936, and the application provider 1936 is responsible for QoS re-configuration in or more MNO networks 620. In certain embodiments, instead of the application provider 1936 performing the QoS re-configuration based on inferred QoS status information, the application function 1938 can perform the following tasks.

Based on received QoS status information from all QoS endpoints (e.g., networks, devices, segments etc.), the AF can generate an updated QoS configuration and re-configure the QoS of those QoS endpoints. Even in this case, the inferring of new QoS configuration from QoS status information is similar to the way how the application provider performed the same task as described in the earlier embodiments.

In case of WebRTC sessions spanning more than one MNO, the AF 1938 in the MNO 620 can directly communicate with the AF 1938 in the peer MNO 620 to exchange "masked" QoS status information instead of the information going through the application provider. When the peer AF 1938 receives such an information, it can perform QoS reconfiguration as described earlier.

Methods for configuration and re-configuration of QoS parameters and methods can be based on QoS status information received from the QoS endpoints. In certain embodiments, based on received QoS status information over a period of time, the QoS configuration responsible party (application provider or the application function) can learn from the QoS statistics, status information and inferred change of QoS configuration information to pro-actively update certain QoS configuration in a different location of the network or in a different MNO. Learning of queue parameter configuration can pro-actively alter the queue configuration in the peer MNO (e.g., based on time of day, periodicity).

Although FIG. 25 illustrates an example QoS compensation 2500 at different MNO networks, various changes may be made to FIG. 25. For example, the number and placement of various components of the QoS compensation 2500 can vary as needed or desired. In addition, the QoS compensation 2500 may be used in any other suitable media streaming process and is not limited to the specific processes described above.

FIG. 26 illustrates an example method 2600 for QoS assurance for WebRTC sessions in 5G networks according to this disclosure. For ease of explanation, the method 2600 of FIG. 26 is described as being performed using the electronic devices of FIGS. 2 and 3. However, the method 2600 may be used with any other suitable system and any other suitable electronic device.

As shown in FIG. 26, the electronic device 300 can receive an expected level agreement (SLA) for a media service from a service provider at step 2602. The expected SLA is effected by different parameters of the WebRTC session. The expected SLA can include a suitable range or an acceptable percentage of performance.

The electronic device 300 can provision a network slice that includes media functions based on the expected SLA at step 2604. In certain embodiments, multiple network slices can be instantiated for the WebRTC sessions. Signaling data, media data, and data channel traffic can be routed through one or more slices. Each of the signaling data, media data, and data channel traffic can be routed through separate slices.

The electronic device 300 can configure the media functions in the network slice with flow prioritization information for each media flow of the media services at step 2606. The flow prioritization can include implementing priority queues at different network functions in the network slice and providing a queue configuration for the priority queues that prioritizes the media flows in the network slice. The flow prioritization can also include determining a priority level for each of the priority queues based on the queue configuration; configuring at least one of a delay, a bandwidth, and a throughput for each of the priority queues based on the priority level for each of the priority queues, wherein a higher priority level configures a priority queue with at least one of a smaller delay, a higher bandwidth, and a higher throughput; and transferring each media flow through the priority queues based on priority levels for the media flows.

The flow prioritization can also include configuring network segments in the network slice with different parameters based on a priority level for each network segment; and transferring the media flows through the network segments based on priority levels for the media flows. The flow prioritization can be different for media flows of a same media type.

The electronic device 300 can determine performance of the media flows at step 2608. The clients 604 communicate using WebRTC and the QoS can be monitored by an application provider 1936 and an AF 1938. The performance can be continuously or routinely monitored for the expected QoS.

The electronic device 300 can perform adjustment of the service parameters based on the determination that the performance of the media flow is below the expected SLA at step 2610. The adjustment for each SLA parameter can be computed such that the performance meets the expected SLA. A list of adjustments to perform can be generated based on the computed adjustment for each SLA parameter.

A first adjustment from the list of adjustments corresponding to an SLA parameter with a highest priority can be applied. Performance can be measured after a predetermined amount of time has elapsed. A second adjustment from the list of adjustments corresponding to an SLA parameter with a second highest priority can be applied when the measured performance has not reached the expected SLA.

Although FIG. 26 illustrates one example of a method 2600 for QoS assurance for WebRTC sessions in 5G networks, various changes may be made to FIG. 26. For example, while shown as a series of steps, various steps in FIG. 26 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
a communication interface; and
a processor operably coupled to the communication interface, the processor configured to:
receive an expected service level agreement (SLA) for a media service from a service provider, wherein the media service includes a plurality of media flows;
provision a network slice that includes media functions based on the expected SLA;
configure the media functions in the network slice with flow prioritization information for each media flow among the plurality of media flows;
determine performance of each of the media flows;
perform adjustment of service parameters based on the determination that the performance of one or more of the media flows is below the expected SLA;
configure network segments in the network slice with different parameters based on a priority level for each network segment;
transfer the media flows through the network segments based on priority levels for the media flows; and
set a delay configuration for each of the network segments to set the priority level for each network segment.

2. The apparatus of claim 1, wherein the processor is further configured to:
implement priority queues at different network functions in the network slice; and
provide a queue configuration for the priority queues that prioritizes the media flows in the network slice.

3. The apparatus of claim 2, wherein the processor is further configured to:
determine a priority level for each of the priority queues based on the queue configuration;
configure at least one of a delay, a bandwidth, and a throughput for each of the priority queues based on the priority level for each of the priority queues, wherein a higher priority level configures a priority queue with at least one of a smaller delay, a higher bandwidth, and a higher throughput; and
transfer each media flow through the priority queues based on priority levels for the media flows.

4. The apparatus of claim 1, wherein the flow prioritization information is different for media flows of a same media type.

5. The apparatus of claim 1, wherein the processor is further configured to:

compute an adjustment for each service parameter such that the performance meets the expected SLA, and generate a list of adjustments to perform based on the computed adjustment for each service parameter.

6. The apparatus of claim 5, wherein the processor is further configured to apply a first adjustment from the list of adjustments corresponding to a service parameter with a highest priority.

7. The apparatus of claim 6, wherein the processor is further configured to:

measure performance after a predetermined amount of time has elapsed; and apply a second adjustment from the list of adjustments corresponding to a service parameter with a second highest priority when the measured performance has not reached the expected SLA.

8. The apparatus of claim 1, wherein the flow prioritization information includes one of priority queue and network segments.

9. A method comprising:

receiving an expected service level agreement (SLA) for a media service from a service provider, wherein the media service includes a plurality of media flows;

provisioning a network slice that includes media functions based on the expected SLA;

configuring the media functions in the network slice with flow prioritization information for each media flow among the plurality of media flows;

determining performance of each of the media flows;

performing adjustment of service parameters based on the determination that the performance of one or more of the media flows is below the expected SLA;

configuring network segments in the network slice with different parameters based on a priority level for each network segment;

transferring the media flows through the network segments based on priority levels for the media flows; and setting a delay configuration for each of the network segments to set the priority level for each network segment.

10. The method of claim 9, further comprising:

implementing priority queues at different network functions in the network slice; and providing a queue configuration for the priority queues that prioritizes the media flows in the network slice.

11. The method of claim 10, further comprising:

determining a priority level for each of the priority queues based on the queue configuration;

configuring at least one of a delay, a bandwidth, and a throughput for each of the priority queues based on the priority level for each of the priority queues, wherein a higher priority level configures a priority queue with at least one of a smaller delay, a higher bandwidth, and a higher throughput; and transferring each media flow through the priority queues based on priority levels for the media flows.

12. The method of claim 9, wherein the flow prioritization information is different for media flows of a same media type.

13. The method of claim 9, further comprising:

computing an adjustment for each service parameter such that the performance meets the expected SLA, and generating a list of adjustments to perform based on the computed adjustment for each service parameter.

14. The method of claim 13, further comprising applying a first adjustment from the list of adjustments corresponding to a service parameter with a highest priority.

15. The method of claim 14, further comprising:

measuring performance after a predetermined amount of time has elapsed; and applying a second adjustment from the list of adjustments corresponding to a service parameter with a second highest priority when the measured performance has not reached the expected SLA.

16. The method of claim 9, wherein the flow prioritization information includes one of priority queue and network segments.

* * * * *